US008032635B2

(12) United States Patent
Moore

(10) Patent No.: US 8,032,635 B2
(45) Date of Patent: Oct. 4, 2011

(54) GRID PROCESSING IN A TRADING NETWORK

(75) Inventor: Dennis B. Moore, Hillsborough, CA (US)

(73) Assignee: SAP AG, Walldorf (DE)

( * ) Notice: Subject to any disclaimer, the term of this patent is extended or adjusted under 35 U.S.C. 154(b) by 1106 days.

(21) Appl. No.: 11/264,415

(22) Filed: Oct. 31, 2005

(65) Prior Publication Data

US 2007/0100961 A1 May 3, 2007

Related U.S. Application Data

(60) Provisional application No. 60/703,781, filed on Jul. 29, 2005.

(51) Int. Cl.
*G06F 15/173* (2006.01)
*G06F 15/177* (2006.01)

(52) U.S. Cl. ........ 709/226; 709/220; 709/221; 709/222; 709/223; 709/224; 709/225

(58) Field of Classification Search .......... 709/201–211, 709/220–226
See application file for complete search history.

(56) References Cited

U.S. PATENT DOCUMENTS

| | | | |
|---|---|---|---|
| 6,335,937 B1 * | 1/2002 | Chao et al. .................... | 370/426 |
| 6,442,557 B1 | 8/2002 | Buteau et al. | |
| 6,571,274 B1 | 5/2003 | Jacobs et al. | |
| 6,691,165 B1 * | 2/2004 | Bruck et al. .................. | 709/227 |
| 6,760,780 B1 * | 7/2004 | Chitturi et al. ................ | 709/248 |
| 6,995,768 B2 | 2/2006 | Jou et al. | |
| 7,007,070 B1 | 2/2006 | Hickman | |
| 7,269,625 B1 | 9/2007 | Willhide et al. | |
| 2002/0073080 A1 | 6/2002 | Lipkin | |
| 2002/0149601 A1 | 10/2002 | Rajarajan et al. | |
| 2003/0200347 A1 | 10/2003 | Weitzman | |
| 2004/0019890 A1 * | 1/2004 | Verbeke et al. ................ | 718/100 |
| 2004/0034807 A1 * | 2/2004 | Rostowfske ..................... | 714/4 |
| 2004/0044718 A1 * | 3/2004 | Ferstl et al. .................... | 709/200 |
| 2004/0054984 A1 | 3/2004 | Chong et al. | |
| 2004/0117358 A1 | 6/2004 | von Kaenel et al. | |
| 2004/0122853 A1 | 6/2004 | Moore | |
| 2004/0122925 A1 | 6/2004 | Offermann | |
| 2004/0165588 A1 | 8/2004 | Pandya | |
| 2004/0249650 A1 | 12/2004 | Freedman et al. | |
| 2004/0254806 A1 | 12/2004 | Schwerin-Wenzel et al. | |
| 2005/0044545 A1 * | 2/2005 | Childress et al. ............. | 717/177 |

(Continued)

OTHER PUBLICATIONS

Folding@home Distributed Computing, Frequently Asked Questions http://web.archive.org/web/20040810014824/folding.stanford.edu/faq.html last updated Jul. 14, 2004; 23 pages.

(Continued)

*Primary Examiner* — Joe H. Cheng
*Assistant Examiner* — Kai Chang
(74) *Attorney, Agent, or Firm* — Blakely Sokoloff Taylor & Zafman, LLP

(57) ABSTRACT

Methods and apparatus can enable a trading network can use participant nodes of the trading network as a hub node to distribute tasks within the trading network, instead of a fixed server as a fixed hub. The trading network can allow for distribution of tasks for grid computing. The trading network can also be enabled to switch from using one participant node as the hub to using another participant node as the hub. Additionally, the hub node can be enabled to pass functionality to another node at the request of the hub node instead of at the request of the receiving node.

24 Claims, 9 Drawing Sheets

U.S. PATENT DOCUMENTS

| | | | |
|---|---|---|---|
| 2005/0055667 | A1 | 3/2005 | Beringer et al. |
| 2005/0076311 | A1 | 4/2005 | Kusterer et al. |
| 2005/0081097 | A1* | 4/2005 | Bacher et al. ............... 714/13 |
| 2005/0081157 | A1 | 4/2005 | Clark et al. |
| 2005/0122906 | A1* | 6/2005 | Yazaki et al. ............. 370/230.1 |
| 2005/0138618 | A1* | 6/2005 | Gebhart ..................... 717/176 |
| 2005/0165854 | A1* | 7/2005 | Burnett et al. ............ 707/200 |
| 2005/0188088 | A1* | 8/2005 | Fellenstein et al. ........ 709/226 |
| 2005/0210118 | A1 | 9/2005 | Hickman et al. |
| 2006/0036880 | A1 | 2/2006 | Maezawa |
| 2006/0136761 | A1 | 6/2006 | Frasier et al. |
| 2006/0282278 | A1 | 12/2006 | Angel et al. |
| 2006/0294238 | A1* | 12/2006 | Naik et al. ................ 709/226 |

OTHER PUBLICATIONS

Folding@home Distributed Computing, Recent Research Papers http://web.archive.org/web/200408100122955/folding.stanford.edu/papers.html last updated Apr. 19, 2004; 11 pages.

Internet Wayback Machine, Jul. 11, 2004, http://web.archive.org/web/*/http://folding.stanford.edu, (Jul. 11, 2004), (Archive of http://folding.stanford.edu).

Fahle, "SAP Web Dynpro: Overview", Seminar System Modeling, Jan. 16, 2005; 16 pages.

Larson, et al., "Using Distributed Computing to Tacke Preciously Intractable Problems in Computational Biology", Horizon Press, 2002; Chemistry Dep't and Biophysics Program, Stanford Univ., Stanford, CA; 31 pages.

Non-Final Office Action for U.S. Appl. No. 11/264,414 Mailed Dec. 9, 2008, 40 pages.

Non-Final Office Action for U.S. Appl. No. 11/263,828 Mailed Dec. 24, 2008, 26 pages.

Non-Final Office Action mailed Jan. 15, 2008 for U.S. Appl. No. 11/263,828.

Final Office Action mailed Jul. 10, 2008 for U.S. Appl. No. 11/263,828.

Distributing Computing Harnesses Unused CPU Power, Feb. 2001, vol. 5, Issue 1; pp. 208-213 (10 pages) http://www.smartcomputing.com/Editorial/article.asp?article=articles/archive/r0501/45r01-45r.

Parvin Asadzadeh et al., "Global Grids and Software Toolkits: A Study of Four Grid Middleware Technologies", Grid Computing and Distributed Systems (GRIDS) Laboratory, Department of Computer Science and Software Engineering, The University of Melbourne, Australia, pp. 1-19.

Global Exchange Services Brochure, "Integrated Solutions That Streamline Cross-Enterprise Business Processes", 2004, 4 pages.

Mark Baker et al., "Grids and Grid Technologies for Wide-Area Distributed Computing", Software-Practice and Experience, 2002, 30 pages.

Ian Foster et al., "The Anatomy of the Grid—Enabling Scalable Virtual Organizations", Int'l J. Supercomputer Applications, 2001, pp. 1-25.

Ian Foster, "Grid Technologies & Applications: Architecture & Achievements", Mathematics & Computer Science Division, Argonne National Laboratory, Argonne, IL, Department of Computer Science, The University of Chicago, Chicago, IL, pp. 1-6.

Final Office Action mailed Sep. 18, 2008 for U.S. Appl. No. 11/181,644.

Non-Final Office Action for U.S. Appl. No. 11/181,644 mailed Feb. 19, 2009, Whole document.

Final Office Action for U.S. Appl. No. 11/264,414 dated May 29, 2009; 22 pages.

Non-Final Office Action for U.S. Appl. No. 11/181,644 Mailed Dec. 9, 2009, 9 Pages.

Final Office Action for U.S. Appl. No. 11/263,828 Mailed Jul. 8, 2009, 31 pages.

Non-Final Office Action for U.S. Appl. No. 11/264,414 Mailed Sep. 30, 2009, 33 Pages.

"BONIC", http://web.archive.org/web/20050630004412/http://boinc.berkeley.edu/, (Jun. 30, 2005).

"Distributed Computing", http://www.tomshardware.com/forum/1140-49-distributed-computing#t4893, (Apr. 6, 2001).

FOA, Final Office Action mailed Aug. 4, 2009 for U.S. Appl. No. 11/181,644.

Anderson, David P., "BOINC: A System for Public-Resource Computing and Storage", 2004, IEEE Computer Society, pp. 4-10.

Anderson, David P., et al., "SETI@home: an experiment in public-resource computing", ACM, pp. 56-61, (Nov. 2002).

Belloum, Adam S., et al., "VLAM-G: A Grid-Based Virtual Laboratory", (Apr. 22, 2002).

Min, Dugki, et al., "Efficient Job Scheduling in a Mesh Multicomputer Without Discrimination Against Large Jobs", 1995 IEEE, pp. 52-59.

Final Office Action for U.S. Appl. No. 11/264,414 Mailed Apr. 26, 2010, 34 Pages.

\* cited by examiner

GRID PROCESSING IN A TRADING NETWORK

RELATED APPLICATION

This application claims the benefit of priority to U.S. Provisional Application No. 60/703,781, filed TBD Jul. 29, 2005. This application is related to U.S. patent application Ser. No. 11/263,828, entitled "Grid Processing Dynamic Screensaver," and U.S. patent application Ser. No. 11/264,414, entitled "Grid Processing User Tools," both filed concurrently herewith.

FIELD

Embodiments of the invention relate to distributed processing systems, and more particularly to distributing computing functionality across a grid network.

BACKGROUND

Grid technology began when JAVA technology computer logic was produced at SUN MICROSYSTEMS, INC., along with JAVA tools and JAVA Applets that enable distributed processing. Limitations on traditional JAVA Applets were that they required a web page in which to operate. To distribute the data processing traditional JAVA applets required a server to coordinate the distribution of data to various computers or central processing units (CPUs). The traditional anatomy of a grid includes a server with the computers, which together form the actual grid. One well-known example of a grid computing project is run by the Search for Extra-Terrestrial Intelligence (SETI), which uses unused CPU cycles on thousands of computers around the world to process signal information in search of coherent signals indicating intelligent life elsewhere in the universe.

Additional developments in connected computing include UDDI (Universal Description Discovery and Integration), which may be considered to be a registry of the types of services a participant in a computing network can provide to the network. Also, various forms of business to business (B2B) implementations exist, including ROSETTANET, which describes distributed processing of trading requests between trading partners.

However, there are limitations on trading networks, especially because of the non-homogeneous nature of computing capabilities across a network, randomly based upon what computing devices are participating in the network. Discrepancies of computing capability may limit the ability of computing devices on the network to interact, and certainly restricts the ability of the network to expand in functionality and evolve over time.

SUMMARY

In one aspect, a trading network can use participant nodes of the trading network as a hub node to distribute tasks within the network, instead of a fixed server as a fixed hub. The trading network can be enabled to switch from using one participant node as the hub to using another participant node as the hub. In another aspect, the hub node may pass functionality to another node at the request of the hub node instead of at the request of the receiving node.

BRIEF DESCRIPTION OF THE DRAWINGS

The following description includes discussion of various figures having illustrations given by way of example of implementations of embodiments of the invention. The drawings should be understood by way of example, and not by way of limitation.

DETAILED DESCRIPTION

Figure 1:
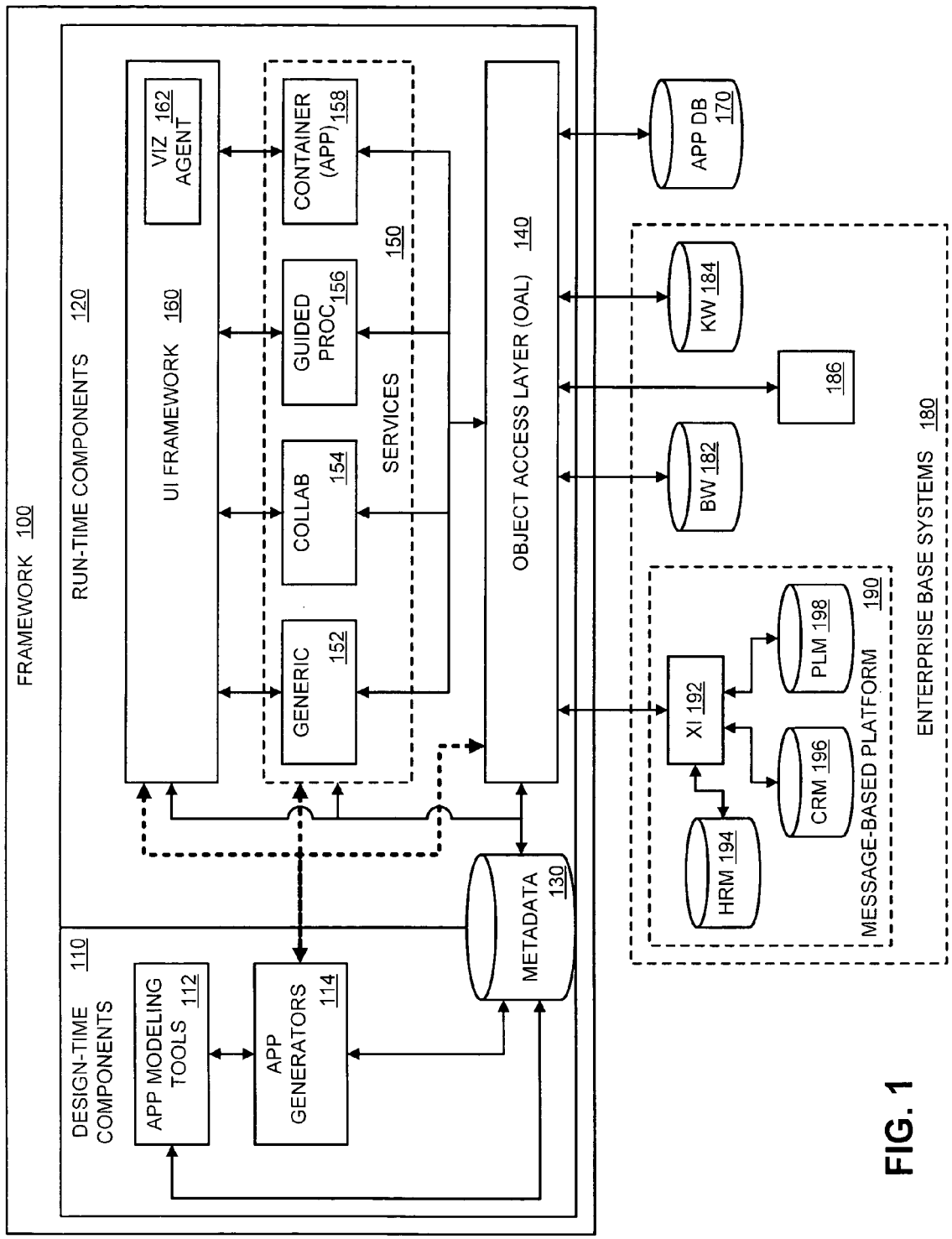
FIG. 1 is a block diagram of an embodiment of a composite application framework with a visualization agent.

As used herein, references to one or more "embodiments" are understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

Various computing devices can be networked, or interconnected via a common medium and supporting access interface mechanisms. A network can also be utilized as a cooperative processing entity, where multiple networked machines or computing devices operate in conjunction, especially in parallel, on a problem. The cooperative processing entity or the network structure to enable the cooperative processing is referred to herein as a "grid." Processing performed on or by a grid is referred to herein as grid processing. Thus, grid computing or grid processing is conducted with a grid or network of computing devices capable of processing commands in parallel, breaking up processing of operations into commands or operations that can be performed in parallel. Parallel operation or execution is in contrast to serial execution, in which a single computing device or "node" executes all operations of a series of operations. The parallel commands can be dispatched for processing to the appropriate execution nodes, and managed across the nodes of the grid. At the completion of execution, results can be collected and aggregated, and potentially further processed. Grid processing is otherwise known as distributed processing and as distributed dispatching. Some network implementations involve the interconnection of separate enterprises through a trading grid, where the trading partners can dispatch and install new trading capabilities between the trading partners over the grid.

For example, a heterogeneous implementation some enterprise software systems (client/server architecture) creates a complex distributed environment involving a repository and one or more application servers and one or more presentation servers. One specific example of such an enterprise software system is the SAP R/3 system available from SAP AG of Walldorf, Germany. The SAP system is specifically a system with an architecture that allows more servers to be added as needed. The servers can be coordinated in many ways, and which could provide a system that delivers and enables rapid and diffuse distributed processing. Again, as a specific example, the SAP R/3 system allows for any participant to become the hub, or the node, at a given time, and allows the node currently acting as the hub to send actual new computing functionality (e.g., programs, functions) to participant nodes across the grid. Sharing computing functionality rather than just sharing computer cycles enables much greater grid functionality.

A corporation/enterprise may have a grid network in place. A grid network refers to a network that enables grid computing, which allows for distributed processing as well as dispatching program functionality from one point on the grid to another. Grid computing or grid processing includes setting up a "grid" or network of computers capable of processing commands in parallel, breaking up processing into commands that can be done in parallel (as opposed to commands which must be executed together on one computer or "node"), dispatching these commands to the appropriate execution nodes, managing the processing across the nodes of the grid, and then collecting and aggregating the results and further processing them.

A network can also be established between business partner enterprises, or trading partners. Such a network can be referred to as a trading network between the trading partners. When trading partners have grid networks in place, one or more grid networks may be utilized in the trading network. The grid network may be considered in one embodiment to be incorporated into the trading network. The functionality of the grid network is utilized by the trading network to facilitate the functioning of the trading network. The trading network can leverage the ability of the grid to dispatch and install computer/computing functionality across members (nodes) of the grid. The ability to pass functionality between nodes of the trading/grid network can significantly enhance the trading capabilities between trading partners.

In enterprise systems with one or more grid networks in place and an established trading network, grid computing can be used in the trading network, which allows business partners to dispatch and install new trading capabilities between the trading partners. Reference herein to dispatching programs and/or functions may refer to the passing of functionality (e.g., processes, routines, applications, data relevant to the functions, configuration parameters, security policies, etc.) from one point on the grid (e.g., from a hub node) to another grid node (e.g., processor). The functionality passed may not have been previously installed or available in the recipient grid node. With a trading partner grid, one trading partner can send new functionality to another, enabling the trading network to grow in capabilities or otherwise evolve over time.

Traditional grid processing allowed for the distribution of tasks across the network. The grid hub is traditionally a fixed server that distributes the tasks. If a recipient node needed information and/or functionality to perform a task, the recipient node had to request the information from the server, which could provide the information at the request of the recipient node. Traditional grid processing was not applied to a trading network. Application of a grid processing network can enable new trading capabilities (e.g., adding a distributed pricing optimization capability among computers on the grid), assumptions (e.g., price or component list data), and/or contracts (e.g., policies about what trading processes are allowed).

A grid processing network utilizes grid dispatching to pass information and/or functionality across the network. Grid dispatching can be used, for example, for point features, available to promise, advanced planning and optimization for supply chains, software upgrades across enterprises (e.g., moving from one version of ROSETTANET to another), data shipment notice, tracking, data for preparation of the data warehouse, reporting data etc. Further examples for distribution in the grid include APO for logistics, quotations with suppliers, catalog assembly or presentment with suppliers, order management including distributed order acceptance, change orders, advanced shipment notice, tracking, data for preparation of the data warehouse, or reporting data. And, distribution between trading partners can be done for other processes, projects, and purposes.

In contrast to the traditional grid processing, the grid trading network (or grid processing applied to a trading network) can allow for passing of information and functionality from the hub to the recipient at the request of the hub. In one embodiment the hub passes the functionality without regard to what is currently available on the recipient node. In another embodiment the hub queries a central database that indicates what functionality is available on the recipient node and passes functionality if the recipient node does not currently have the functionality. In another embodiment the hub node queries the recipient node to determine if the recipient node has the functionality and passes the functionality if the recipient node does not currently have the functionality.

In one embodiment the enterprise infrastructure allows for the distribution of computing functionality across a grid network, with the role of distributor and distributee being flexible and changeable. Flexible roles of distributor and/or distributee can allow any member of the grid network to act as the host for a particular transaction. As one example, a heterogeneous implementation of the SAP R/3 enterprise software system (client/server architecture) creates a complex distributed environment having a repository, one or more application servers, and a presentation server, in an architecture which allows more servers to be added as needed. An enterprise that implements such an enterprise software system can provide an enterprise infrastructure that enables rapid and diffuse distributed processing.

A trading partner grid could be of any size, and may exist within an organization and/or across organizations/enterprises. Similarly a trading network utilizing the trading partner grid could be of any size, with many companies participating, or one department working with another company. The trading partner grid may include a government entity as a participant. For example, a government could work with a company. In an embodiment where a government/government agency is included in a trading grid, a government agency could act as the hub node for the distributing of legal or regulatory required changes (e.g., tax tables, new reporting capabilities required, regulatory forms, etc.). Other entities that may be trading partners in the grid include, but are not limited to, a customer, a supplier, a software vendor distributing product updates, etc.

As discussed above, in one embodiment an enterprise structure can provide an architecture to allow each node access to server functions/services. Thus, rather than having a single distribution server, different nodes can act as different participants for different transactions. One trading partner could be identified as the "hub node" for a particular transaction, because the node will distribute tasks and can send the desired functionality to other trading partners to accomplish those tasks. The other trading partners are the recipients, or "spoke nodes." The "hub node" partner is the one who presently wants the functionality to be distributed in the grid.

Note that each node can and does have its own data. For example, each node may have its own inventory, prices, contract, etc. The functionality that is passed among the nodes in the grid trading network may allow the nodes to perform an operation or provide information based on their data. Thus, when a node acts as the hub, the node sends to the other nodes new processing capabilities, because it desires the other nodes to use the new functionality. For example, a hub node may pass functionality to another node to enable the other node to not provide pricing, but to perform quality forecasting, or other reporting back desired by the hub node. The hub node may both indicate with a message that it wants the other to provide the desired function, as well as pass the functionality needed to provide the desired function. Note that in this manner the functionality is not passed through a grid "server," rather, from system to system at the request of the sender, not at the request of the requester.

Traditional trading systems, for example business-to-business (B2B) trading systems such as ROSETTANET allow for the establishment of a contract applied to topics such as orders, inventory positions, change orders, and etc. Because a trading network as described herein can be structured to allow for the dispatching of new trading network functionality among the grid, the extent and application of contracts can also be changed to reflect this capability. Hub and spoke nodes can establish a contract for how processing capabilities can be requested, dispatched, and/or accepted. In one embodiment a hub and spoke may include a contract that specifies how one or more contracts can be updated over time. The contract may exist at the level of the enterprise, for example, within one or more elements of enterprise data. With the contract at the enterprise level, a node acting as the hub node for a transaction may access the contract to determine what functionality may be passed to the intended recipient node, or whether negotiations with the intended recipient node need to be made before it can be passed functionality, or whether a security procedure (e.g., an authentication procedure) must be engaged in prior to distributing functionality to the intended recipient. Additionally, the access of contracts may affect a decision by the hub node as to which nodes to use for a transaction (e.g., only use nodes that can accept the type of functionality to be passed for the transaction, or use nodes that already have a particular functionality, etc.).

With the distribution of functionality through the trading network, the trading partners need not all have the same software applications/functions installed in order to benefit from the system functionality. Differences in standards or other requirements of customers or suppliers, for example, would not be costly for each trading partner to maintain.

The dispatching and execution of functionality through the trading network can apply to "discrete" functions and "distributed" functions. Discrete functions refer to functions that can be fully executed by the node (e.g., inventory status, order status, price check). Distributed functions refer to functions where processing is executed in an integrated and distributed fashion (e.g., distributed supply chain optimization, distributed pricing optimization, distributed available to promise).

System-to-system dispatching and execution of computing capability over a network between trading partners is possible because of communication at the application level, rather than at the database level in the network described herein. Middleware enables the application level communication. The middleware can enable trading partners to build and operate applications and to exchange transactions data. For example, in an embodiment where SAP R/3 is employed by an enterprise, the exchange of data from different systems, which in turn enables the application and function distribution, can be enabled by SAP middleware. For example, SAP Application Linking and Embedding (ALE), SAP Remote Function Call (RFC), and SAP Intermediate Documents (iDOCS) or XML can enable data exchange between SAP and non-SAP applications. In an embodiment where SAP NETWEAVER is employed by an enterprise, SAP middleware that enables the exchange of data across systems includes SAP EXCHANGE INFRASTRUCTURE (XI), which may in turn include SAP BUSINESS CONNECTOR (BC). SAP BC employs XML and uses as a tool to format messages. SAP WEBDYNPRO provides mechanisms for accessing and/or viewing/displaying data.

SAP ALE refers to intelligent middleware that makes it possible for applications to exchange data between different and technically independent systems, for example, to link SAP and non-SAP applications. SAP RFC refers to the programming interface of R/3. RFC can be used to call functions, modules and external applications. SAP iDOCs make possible smooth and secure exchange of messages containing application data. Also, in an SAP NETWEAVER implementation, SAP Master Data Management (MDM) can be used in place of ALE. SAP XI and SAP BC enable smooth and secure exchange of messages containing application data. Although specific SAP middleware is referred to, other comparably functional middleware or functions may be used. In addition to the middleware technology discussed, capabilities of web server application or packaged composite applications can enable a trading network. Web services applications (e.g., SAP xAPPs) can function on top of existing systems and applications to provide translation and/or unification of the systems.

Furthermore, the access or exchange of information across a grid trading network may be enabled by, and/or include reference to one or more data objects. A data object refers to an information object or simply an "object," which relates to enterprise data and/or grid data. A portal is created for or from/on the computing device of interest to connect, create, or otherwise use any object or objects. A portal as used herein refers to a single, controllable point of access. The portal refers to an interface from the computing device to the grid and/or the enterprise network. The controllable nature of the access refers to the ability to set parameters or limits on the scope of functionality of the portal. A portal may reference a single data object to allow access and/or visual representation of the object on the computing device. The portal can be created from the SAP ENTERPRISE PORTAL 6.0 (SAP EP). A portal is particularly useful for a heterogeneous enterprise software implementation which also involves a grid.

A portal may include one or more WebDynpro Views or iViews or type-able fields, or WebDynpro pages containing several iViews, each of which represents an interface mechanism to enable the portal to access the network. Either WebDynpro Views and/or iViews may be used, or some comparable technology. For ease of description, and not by way of limitation, the description herein will generally refer to Web- Dynpro Views. In one embodiment a WebDynpro page having multiple iViews can be used. Thus, the technologies are also not necessarily mutually exclusive. iViews and/or WebDynpro Views access and display data from across the grid trading network. WebDynpro Views also display data about the individual computing device as a member of the grid. WebDynpro Views allow settings to be made by the user. A WebDynpro View can enable a "type-able field" to allow input from a user. The WebDynpro View may include one or more function calls, routines, or sequences of instructions to cause certain operations in the computing device. In one embodiment the portals or WebDynpro Views may enable a port or channel connection to the network, for example, through access to enterprise business logic.

For presentation tools, a portal may be populated with one or more "WebDynpro Views," to enable access to data to present on the computing device. A display box or WebDynpro page or WebDynpro screen is created and WebDynpro Views can be created upon the display. For ease of description, and not by way of limitation, the term "WebDynpro page" may be used herein to represent a display box or page with WebDynpro Views or other comparable technology. In one specific implementation, SAP NETWEAVER VISUAL COMPOSER is used to create the WebDynpro page. SAP NETWEAVER VISUAL COMPOSER can also be used to access and display data objects from a backend SAP ENTERPRISE system and an SAP MYSAP BUSINESS SUITE, which can enable the shared grid. Once the WebDynpro Views are on the WebDynpro page, they can communicate with each other, as well as with the backend application, or the website whose data they display. The communication of a WebDynpro View with another WebDynpro View or other entity can be referred to as "eventing." Any "event" in one WebDynpro View, such as a mouse click or other selection mechanism, can cause one or more other WebDynpro Views to display corresponding material. Thus, if multiple WebDynpro Views include related information among their data, their displays can be coordinated. For example, a WebDynpro View displaying Outside Grid Members can be displayed on a computing system. If a user selects a Growth Company's computer in the list of grid computers currently active in the grid, the other WebDynpro Views on a common portal display may immediately display any other information they have regarding the Growth Company's computer. The WebDynpro page can be customized to the individual preferences of any user, for example, regarding the overall layout. The layout customization is implemented by any user, simply by moving the WebDynpro Views around the screen, or adding or deleting a WebDynpro View. A user can also configure any WebDynpro View content.

The WebDynpro Views may also use monitoring to adjust to dynamic information on the grid. Each WebDynpro View can be configured for periodic polling for information and/or for external change-triggered eventing. In one specific implementation, monitoring can be performed with SYSTEM LANDSCAPE MONITORING with the SAP ENTERPRISE PORTAL and the ENTERPRISE PORTAL SOLUTION LANDSCAPE, which employs the SAP CCMSR (Computing Center Management System Report) agent, which in turn receives monitoring from JMON (J2EE (JAVA 2 Enterprise Edition of SUN MICROSYSTEMS of Santa Clara, Calif.) Monitoring). One source of these monitoring tools is the SAP COMPUTING CENTER MANAGEMENT SYSTEM (CCMS), an application that contains an integrated suite of tools for monitoring and managing R/3 and independent SAP components.

FIG. 1 is a block diagram of an embodiment of a composite application framework with a visualization agent. In general, framework 100 leverages and enhances underlying enterprise base systems 180, which could include one or more of a knowledge management warehouse (KW), a business (intelligence) warehouse (BW), an exchange infrastructure (XI), supporting business transaction systems (e.g., customer relationship management (CRM), human resources management (HRM), product life-cycle management (PLM)), etc., with tools, content, and guidelines to provide a foundation for developing and executing composite applications.

Composite applications typically implement new or additional processes in an existing IT landscape, as opposed to the core transactional processes. Composite applications may also support semi-structured processes, handle event-driven and knowledge-based business scenarios, and/or support collaboration in teams. In one embodiment composite applications may support the JAVA stack. The composite applications may be broken down into various portions, each of which may be separately generated/modeled. The composite application portions may, in one implementation, be implemented as Enterprise Java Beans (EJBs), and in other implementations, the design-time components may have the ability to generate the run-time implementation into different platforms, such as J2EE, ABAP, or .NET.

Framework 100 may provide modeling and configuration tools (e.g., business object modelers, guided procedures), generic components (e.g., user interface (UI) patterns, generic services (functional key actions, help, authorizations)), standardized interfaces (e.g., object access layer), reusable content (e.g., predefined object models, XI content), and/or integration infrastructure (e.g., provide connections to business objects and/or documents, provide access to XI proxies). Framework 100 allows composite applications to be created according to guidelines, or documentation that allows composite applications to be created in a controlled and/or predictable manner. The guidelines may or may not be implemented in software.

Framework 100 may be implemented using readily available technology. For example, framework 100 could be implemented using mySAP technology components. In one embodiment the components may include an SAP WEB APPLICATION SEVER (WAS) to run applications, an SAP ENTERPRISE PORTAL to render applications, an SAP KW to handle unstructured information sources, an SAP BW to provide reporting and analytics, data mining, and planning and simulation, SAP BUSINESS PROCESS MANAGEMENT (BPM), an SAP Exchange Infrastructure (XI) to provide shared integration knowledge separate from applications, and/or SAP WEB SERVICES to offer business functionality over the Internet.

For instance, an SAP WAS may include a J2EE engine, SAP IDE, Universal Workflow, and Deployment Service. The WAS may also include a pattern-based and freestyle-based user interface development and interface module. Also, an SAP ENTERPRISE PORTAL may provide unified access to applications, information, and services by using views, roles, pages, worksets, top-level navigation, and KM. This enterprise portal also provides login management and user management. For KM, unstructured information consists of collaboration and content management. For collaboration, KM enables team-driven business processes, synchronous and asynchronous applications, groupware integration, calendars, bulletin boards, threaded discussions, and collaboration rooms. For content management, KM handles documents, feedback, rating, publishing, subscription, document workflow, versioning, archiving, indexing, searching, and taxonomies. SAP BPM may cover life cycles (e.g., design, development, deployment, and change). An SAP XI may provide external and internal integration of system and connectors to various systems such as ORACLE, SIEBEL, PEOPLESOFT, and/or SAP. The SAP XI may be based on Web services, JAVA, and XML standards. SAP Web services may provide a service provider, service handler, and service user. Additionally, an SAP BW may be used.

In one embodiment the KM and collaboration functionality may be embedded in applications, rather than, or in addition to being found in separate pages in the portal. Framework 100 supports development with any of a number of general development environments, for example, JAVA, with EJB (Enterprise JAVA Beans) 2.0, JDO (JAVA Data Objects), JAVA persistency, and/or JAVA application logic, Advanced Business Application Programming (ABAP), and Web services. Existing ABAP components may be integrated via JAVA connector calls. In one embodiment the complete JAVA stack could be used. Furthermore, Web service technology may be used for remote access.

In general, framework 100 allows composite applications to work with existing system landscapes, because framework 100 can decouple composite applications from the underlying enterprise platform. Decoupling may involve providing communication to back-end systems via a central interface and providing a back-end-independent object model. Providing a back-end-independent object model may be implemented to allow data from the source systems to be transformed into a unified structure. Transforming the data into a unified structure can further allow successive installation, activation, and use of different applications, which may reduce entry costs. Additionally, framework 100 facilitates highly efficient development of composite applications. Development of composite applications can be accomplished by model-driven composition of applications, service-oriented architecture, UI and application patterns, reusable object models, and methodologies. Thus, framework 100 could be viewed as a kind of application factory, which enables application building in part or in whole without programming.

Examples of the types of business processes supported by framework 100 include enterprise change management, product innovation, employee productivity, and enterprise service automation. Enterprise change management may support enterprises when merging, splitting, acquiring, spinning off, or reorganizing. Product innovation may support the life cycle of a product, including the preproduction phase(s) of collecting ideas and consolidating them into concepts, the market launch phase, and the end of life. In dealing with the life cycles of a product, the resources of a PLM and CRM may be drawn upon. Employee productivity aims to increase employee productivity, decrease costs, and increase employee satisfaction. Key functions may include manager self services, employee self services, expert finders, e-procurement, and e-learning. Enterprise resource management (ERM) and business to employee (B2E) resources may be drawn upon to accomplish these tasks. Enterprise service automation provides administration and monitoring functions as well as evaluation tools to facilitate project success, for example, as in the case of setting up a project and staffing the project with people having the required skills and availability to accomplish the project. Additional application families may also be created.

Framework 100 may also provide external services in a shared object environment, for example, by providing a uniform object access layer and service layer that bundle functionality across service components. Furthermore, a transparent mapping may be provided from the application's perspective. Thus, the application built on the framework would not have to know whether certain services are provided by a portal, by a KW, by a WAS, or other external service.

Framework 100 includes design-time components 110, run-time components 120, and metadata repository 130, which is shared by the design-time components and the run-time components. Metadata repository 130 represents an abstraction of one or more data and/or access/service resources design-time components 110 and run-time components 120 may draw on, and is not necessarily to be understood as a resource within one of the components, or available only to the components. In general, design-time components 110 are responsible for developing composite applications that are executed by run-time components 120.

Design-time components 110 provide a repository and user interface for modeling and generating business objects, business services, business processes, user interfaces, and/or other aspects/components of a composite application. A business object may be, for example, an employee, a product, a plant, or any other semantic representation of a real-world entity. A business service is an action taken on a business object. Changing the price or category of a product are examples of services for a business object that represents a product. As another example, gathering input from employees and customers (who may themselves be represented by business objects) for a new product idea could be considered a business service. Combining business services to allow the services to operate together, in sequence and/or in parallel or otherwise in conjunction, produces a business process. A composite application may include any number or combination of business objects, business services, and/or business processes.

Design-time components 110 include application modeling tools 112 and application generators 114. Design-time components 110 may draw on information from metadata repository 130. Modeling tools 112 represents one or more tools that may be used for modeling business objects, business services, business processes, user interfaces, etc. A separate modeling tool may be used for each portion/component/segment of a composite application. Additionally, a single modeling tool could provide functionality for multiple portions of the composite application. Furthermore, modeling tools 112 may be used for integrating business objects, business services, business processes, user interfaces, etc. Thus, framework 100 may support model-driven composition of composite applications, allowing for development with little or no programming effort.

In one embodiment application generators 114 allow template-based generation of JAVA-coding, database tables, entries in metadata repository 130, XML configuration files, etc. The template-based generation of information may be implemented with extensibility and the ability to conduct upgrades without loosing his information. The ability to implement with extensibility and upgradability can be achieved by allowing the metadata of the new implementation to be compared with the metadata of the existing implementation during an upgrade. If there are implementation-specific extensions, they may be identified, and strategies for solution of possible conflicts may be proposed.

Metadata repository 130 can include metadata about business objects, business services, business processes, and/or other application portions for use in modeling and/or executing the application portions. Thus, an application portion may be modeled, as well as the origin of the data, whether in a local database, remote database, or a combination of the two. In one embodiment the content of metadata repository 130 includes information extending beyond a specific implementation of an application portion. There could be repositories that describe a specific implementation, which may be filled from a more general repository. Metadata repository 130 can be understood as including a general, a specific, or a combination of repository information.

The metadata can enable generic services like automatic generation of default UIs, object access interface, data access methods, persistency, and mappings. Metadata repository 130 stores the content of the composite application (e.g., specific business objects, information about services, and, eventually, processes) and makes the metadata information available at run-time (if needed). Metadata repository 130 may allow different metamodels to be created (the model for business objects being one of them) and to persist the metadata. For specific purposes, additional repositories, such as, for example, a portal content directory (PCD), which may contain portal specific pieces of an application (e.g., views, pages, roles), may be required.

Application generators 114 generate source/executable code from the application portions modeled by modeling tools 112. Application generators 114 may include and/or use templates to generate the code. One or more templates may be stored, for example, in metadata repository 130. In one embodiment application generators 114 are driven by the metadata in metadata repository 130 to automatically create JAVA classes (e.g., for use in run-time components 120) and/or configuration files (e.g., to adjust user interface (UI) patterns to a certain business object). Thus, the connectivity to back-end systems and the application persistency may be generated, as well as a default user interface. Application generators 114 may also generate interfaces for application services, data access logic, and persistency.

Run-time components 120 provide the run-time environment for business objects, business services, business processes, user interfaces, etc., as well as data access abstraction. Run-time components 120 may include object access layer (OAL) 140, service layer 150, and a UI layer including UI framework 160 and visualization (viz) agent 162. Run-time components may draw upon the resources of metadata repository 130. In one embodiment run-time components 120 also use application database 170, which may store additional information for executing the composite applications. For example, application database 170 may store data tables for executing applications.

OAL 140 manages interaction between composite applications and enterprise base systems 180, and can provide a uniform interface for composite applications to enterprise base systems 180. Thus, OAL 140 can reduce the knowledge needed for a composite application developer about the source of data because OAL 140 sits on top of, and embraces different connectivity technologies. OAL 140 may act as a dispatcher to provide access to a variety of data sources. OAL 140 may leverage message-based platform 190, which may include XI 192 with connectivity to underlying applications. The underlying applications can include one or more of HRM 194, CRM 196, or PLM 198. OAL 140 can also leverage business intelligence warehouse (BW) 182 and/or knowledge management warehouse (KW) 184. In general OAL 140 provide connectivity to any underlying application/service, or enterprise base system, and may include some other application or service 186 not specifically described herein.

OAL 140 may also leverage a fairly synchronous infrastructure such as a service-oriented data access, which could be a BW, and a KW repository framework, which may allow connection to document management systems or to LDAP (Lightweight Directory Access Protocol), a more unstructured type of data. Thus, OAL 140 may bring structured and unstructured data closer together.

Coding and configuration data for OAL 140 may be automatically generated, at least in part, by business object metadata in repository 130. Furthermore, OAL 140 allows for local persistency (e.g., connectivity to a local database such as application database 170 to store data). Data synchronization and replication of remote data (e.g., data in back-end systems) into the local persistency database may be supported. For an application sitting on top of OAL layer 140, the source of the data may be completely transparent, which may assist in keeping application logic stable since the application is, at least for the most part, not affected by underlying systems. In one embodiment OAL 140 includes extensions to document management or content management that allow business objects to use the functionality for documents.

In one embodiment OAL 140 includes extensions to document management or content management that allow business objects to use the functionality for documents. For example, taxonomies for business objects, transparent indexing of TREX for structured and unstructured objects, and subscription services for dependent objects independent of the repository where the objects reside may be provided. OAL 140 may also provide transaction support, in as far as the transaction concept is also supported by concerned source systems, a metadata interface, allowing an application to be dynamically configured at run-time, and subscription services (e.g., J2EE publish and subscribe).

OAL 140 may have a variety of features, for example, by making the origin of data transparent to the application logic and UI to keep the application logic and UI stable. Thus, there may be little to no impact of the underlying information technology (IT) system landscape on the application logic or UI, because OAL 140 handles adaptation to the specific landscape. Furthermore, the abstraction provided by OAL 140 can prevent changes to enterprise base systems 180, such as KW and XI, from having a direct influence on the application logic or the UI. Thus, the underlying functionality may be changed without affecting the application logic or overall user interface experience.

Additionally, OAL 140 may accelerate composite application development. In one embodiment business objects are reused across composite applications, avoiding redevelopment of functions already developed, and potentially avoiding the need to port to a new environment. Example of reuse and development acceleration may include reusing enterprise base systems 180 access services (e.g., KW, XI) across composite applications, reusing know-how (e.g., uniform interface structure providing common access to business objects), efficient (e.g., model-driven) implementation of business objects based on a repository, and/or using a relative homogenous structure for application logic, which simplifies modifications and maintenance.

Additionally, OAL 140 may enable integration. Integration may be facilitated by communication between composite applications via a shared object model, shared contexts across composite applications based on a shared object model, and integration of enterprise base system (e.g., KW and BW) via a composite application object model. The integration may also involve integrating business objects.

Additionally, OAL 140 may facilitate application building by configuration. Application building by configuration can be accomplished by providing standard interfaces with well-defined semantics, which allows components to be combined in a meaningful way since the semantics of the components' interfaces is known, and allowing objects to participate in a collaborative context, (e.g., chat room) just by implementing certain interfaces.

Service layer 150 provides services for business objects in OAL 140. In general, services for business objects are common procedures that users need to interact effectively with the objects. Service layer 150, for example, may include generic services 152, collaboration services 154, guided procedure services 156, a container for application services 158, and/or other services not depicted in FIG. 1. Thus, a service layer 150 may be more or less complex than what is shown, and may include multiples of a particular type of service, and other services not shown. By separating the services from the business objects, the services may be more readily reused across business objects. In one embodiment service layer 150 provides integration of external services.

Generic services 152 provide one or more standard services for parts of an application. A standard service may refer to traditional services, as well as services that are useful to more than one application. Generic services 152 may also provide namespace and packaging concepts. Generic services 152 are typically not bound to a portion of an application, but are available to all portions. Examples of generic services 152 include print services, value help services, authorization, personalization, and voice enablement. An example of a value help service is the filling of drop down boxes in user interfaces; the service is able to determine what the possible entries are for boxes and to populate the boxes therewith.

Collaboration services 154 represent one or more services to provide the ability to link semantic objects to business objects. Semantic objects typically provide a set of generic services, like classification, notification, subscription, feedback, search, retrieval, rating, time-based publishing, state-based publishing, and security model. In addition, relations between semantic objects may be supported. For example, a team could be assigned to a task, and people could be assigned to the team. Moreover, a room could be created for the task, to keep people and documents together. Semantic objects such as document, folder, room, task, meeting, user, and discussion may be accessible via OAL 140. Semantic objects may also be available in a variety of other ways. For example, semantic objects may be included in OAL 140 as business objects and/or service, and/or individual services of semantic objects may be included in service layer 150.

Collaboration services 154 extend the semantic object concept by making the functionality of semantic objects available for business objects (e.g., notification, subscription, etc.). Thus, collaboration services 154 provides collaboration context for a business object. Collaboration services 154 may automatically manage the relations between business objects and semantic objects. In addition, new kinds of relations may be supported: for example, relations between business objects and semantic objects. Thus, a task or a team may be assigned to a specific product, people may be assigned to the task, and so on. Furthermore, special collaborative services may be provided for semantic objects, such as scheduling and assignment functions for tasks and inviting, splitting, and closing functions for discussions. In particular implementations, a suite of collaboration services may be provided without the need to deal with KM specific. These services may also be made available for composition applications. Furthermore, the relation between the business objects and the semantic objects may be maintained. The collaboration provided by collaboration services 154 may be semi-structured processes. A common understanding of a business process may be reflected by a predefined collaboration scenario. On the other hand, the business process may be adaptable to different enterprise's needs. To support this, differing scenarios may be built with minimal programming.

Guided procedure services 156 allow business objects to participate in guided procedures. A guided procedure is a series of steps, which may involve human interaction and can be performed during the execution of a composite application. A guided procedure may be considered to be a type of workflow. A guided procedure may be common to a variety of applications and, thus, may be reused. To provide guided procedures, guided procedure services 156 may provide pre-defined building blocks for process workflow and pre-defined actions. Additionally, guided procedure services 156 may facilitate template design. This may be used to support role-based collaborative processes, process workflow, and/or context definition. At run-time, guided procedures may be implemented by using template instantiation, by design-time integration for ad hoc adaptation of templates, and procedural navigation and integration in a Universal Worklist (UWL). Furthermore, guided procedure services 156 may provide context awareness and sharing by context mapping of building blocks, business object integration, and user assistance. Additionally, guided procedure services 156 may provide monitoring and analysis of guided procedures.

Application services container 158 can be used to implement model specific services for one or more business applications. Although generic objects, generic services, and/or processes may be generated for an application, some business logic is too specific to be implemented generically. For example, determining the number of vacation days that an employee has may involve determining the number of vacation days the employee is entitled to per year, determining the number of days available based on the employee's service to date for the year, determining how many days the employee has been absent to date for the year, and determining whether to assign those days to vacation days or sick days. Furthermore, if the employee is splitting time between departments, an allocation may need to be made between the two. As another example, an order process at a manufacturer may include obtaining an order, splitting the order into components based on the bill of materials, determining whether each component is in stock, if a component is not in stock, determining where and/or how to procure it, and, if a component must be procured, determining a potential delivery date. The business logic for such tasks may be difficult to model generically, especially across a wide variety of industries. Thus, the logic may be specifically coded to the specific task(s). Container for application services 158 provides one or more interfaces for the task-specific code to be used. The interfaces may be generated by the metadata of the service model, with the inner code individually or specifically programmed for the particular task. Also, maintaining the service definition in the design-time allows generation of an empty service.

The UI layer includes UI framework 160 and visualization agent 162, which will be discussed briefly here, and in more detail below. UI framework 160 provides user interfaces that allow a user to interact with composite applications. In particular implementations, UI framework 160 provides pattern components, such as, for example, a dashboard, a search bar, a browse and collect function, an object editor, and phases for a guided procedure, as building blocks for user interfaces. UI framework 160 may also decouple application logic from the UI, for example, by having a separation of the business objects of OAL 140 and application services of services layer 150, from the user interface elements of UI framework 160. The separation or decoupling can provide for the reuse of UI components in different application contexts. The decoupling can also enable business objects and application services to be visualized differently according to the specific equipments of a certain use case.

In one embodiment UI framework includes visualization agent 162 to provide visualization and/or other presentation of data/information and/or service options to a user. Visualization agent 162 may generally be described as providing the combinations of various presentation methods based upon the various navigation, working context, and/or data types, as described above. Additionally, visualization agent 162 may provide services to enable the presentation of thumbnail representations of various business processes, including structure and status of the processes. In one embodiment the thumbnail representations further include mechanisms to allow drilling down to additional information related to the process, and/or the process itself.

UI framework 160 may also leverage the metadata information on business objects and services through metadata-driven UI-generation and configuration. The metadata approach allows for ready adaptability to alternative screens depending on the end users needs (e.g., in different industries). UI framework 160 may additionally allow integration (e.g., binding) into OAL 140 to access business objects, business services, and metadata. Thus, UI components may be connected to business objects or other base systems through OAL 140. UI framework 160 may support any appropriate type of user interfaces, such as, for example, a user interface composed of pattern-based components and/or freestyle components with interfaces to the user interface components or JAVA SERVER PAGES (JSPs) from SUN JAVA SERVER PAGES (JSPs) available from SUN MICROSYSTEMS, INC., of Santa Clara, Calif. UI framework 160 may also support a JAVA front-end and ABAP back-end, a JAVA front-end and JAVA back-end, or any other appropriate combination of front-end and back-end. The framework may additionally provide a construction kit for complex components and applications and configuration of patterns via XML, URL, or other appropriate technique.

Framework 100 may be connected to application database 170, which may provide a central repository for available business objects. An example of data in application database 170 includes database tables for a business object. The data may be added to, changed, and/or deleted. Data may also be stored in KW, BW, or an XI system. As discussed, framework 200 provides a set of standard services that enables application developers to make use of the data. The origin of the data and/or its persistency may be transparent to the application developer, not to mention the composite application.

Figure 2:
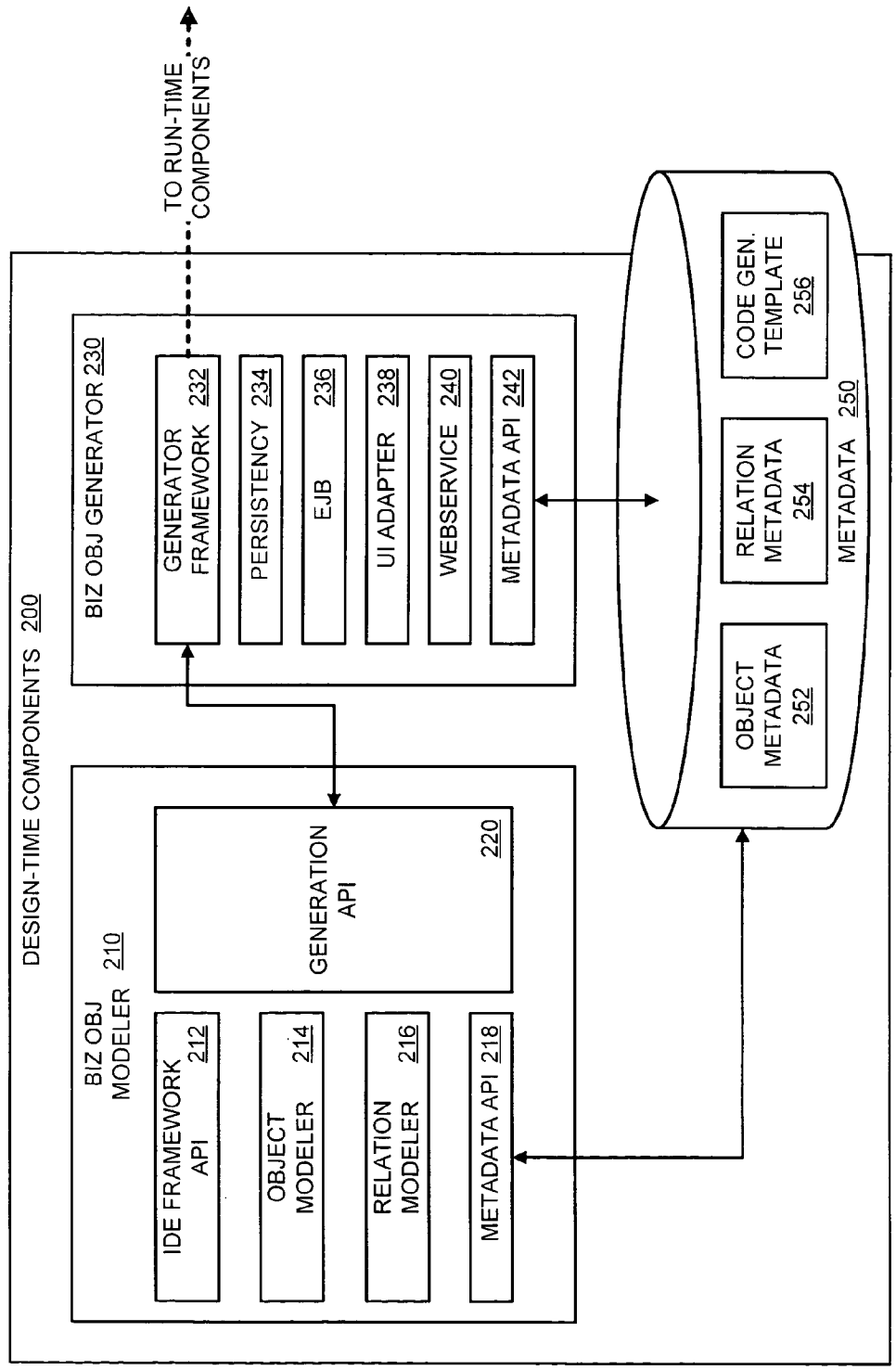
FIG. 2 is a block diagram of an embodiment of design-time components of a composite application framework.

FIG. 2 is a block diagram of an embodiment of design-time components of a composite application framework. Design-time components 200 provide one example of design-time components 110 of FIG. 1. Design time components 200 include business object modeler 210, business object generator 230, and metadata repository 250. Metadata repository 250 can also be considered, at least in part, a run-time component.

Business object modeler 210 may include various components, for example, Integrated Development Environment (IDE) framework application program interface (API) 212, object modeler 214, relation modeler 216, and metadata API 218 to access metadata repository 250. Fewer components than what are shown may be included in one embodiment of the invention, and more complex variations are also possible, including components not necessarily shown. IDE framework API 212 allows object modeler 214 to be integrated into an IDE (e.g., an ECLIPSE IDE), which supports the modeling of the business object by object modeler 214. For example, the integration may support generation of business objects as EJBs, interfaces for application services, default user interfaces, data access logic, and persistency. Relation modeler 216 allows the modeling of relations between modeled objects. For example, a sales order could consist of a customer, a product, and a price. Relation modeler 216, therefore, could provide for the modeling of the relations between these items. In operation, for instance, if a user interface is generated for a sales order, the semantics for each field in the sales order may be identified. Additionally, a connection to the value help function may be facilitated. Metadata API 218 enables business object modeler 210 to store and access business object metadata in metadata repository 250 and relation modeler 216 to store and access business object relation metadata in metadata repository 250.

Business object modeler 210 also includes generation API 220, which allows a business object to communicate with generator framework 232 for code generation, and providing the generated code to a run-time environment.

Business object generator 230 can include generator framework 232, persistency generator 234, EJB 236 generator, UI adapter generator 238, Web service generator 240, and metadata API 242. Generator framework 232 may also be integrated into the IDE accessed through IDE framework API 212.

To generate a business object, business object generator 230 may use templates in metadata repository 250 and code them with object metadata and relation metadata in the repository. Business object generator 230 may also generate the data persistency for the business object, and generate the actual business object (e.g., an EJB). Business object generator 230 may additionally generate user interfaces for the business object and any necessary Web services. Templates used by business object generator 230 may be generic. In one embodiment the various generation components automatically create JAVA classes (e.g., for the implementation of the object access layer), JDO tables, EJBs, and configuration files, to adjust UI patterns to a certain business object, for example. Thus, the connectivity to back-end systems and the composite application persistency is generated as well as a default User Interface. Furthermore, UI adapters for a UI development and interface module and, if necessary, Web services may be generated. The output of such a process may be real working code in the object access layer of the run-time components.

In one example, business object generator 230 generates a run-time implementation of a business object in an object access layer. Business object generator 230 reads the business object metadata from metadata repository 250 and generates JDO persistency, connectivity to an XI, a KW and/or a BW (e.g., by using proxies), generates generic methods, and a basic UI. For this coding, templates (e.g., for services) or XML-templates (e.g., for JDO persistency) are used where business object specific coding or XML is added, and the result is stored as complete code or complete XML.

Metadata repository 250 may include various items of data, including, but not limited to, object metadata 252, relation metadata 254, and code generation templates 256. The information in object metadata 252 and relation metadata 254 may be used to code templates 256 to generate a business object.

Figure 3:
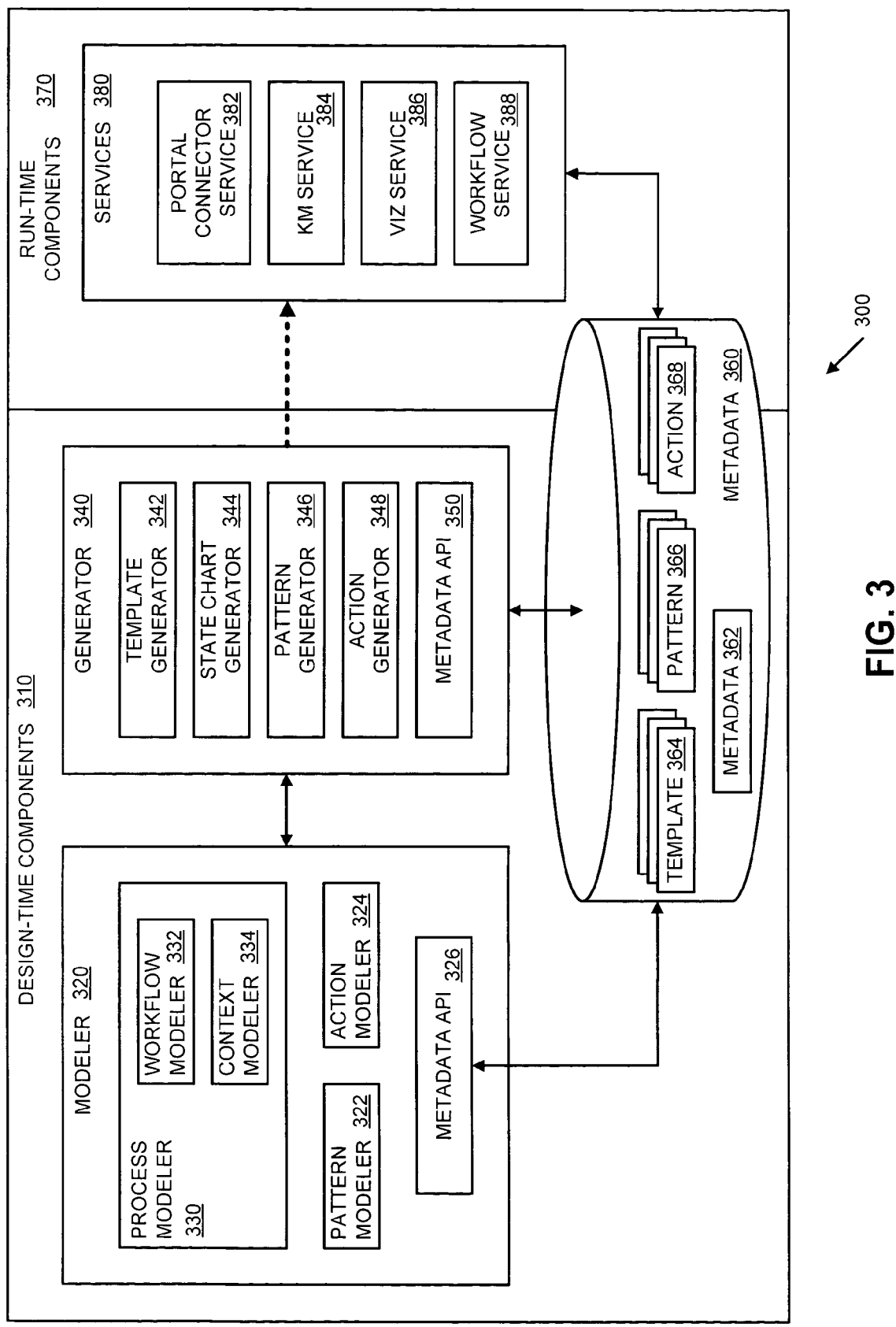
FIG. 3 is a block diagram of an embodiment of guided components for a composite application framework.

FIG. 3 is a block diagram of an embodiment of guided components for a composite application framework. As mentioned previously, a guided procedure is a series of operations/functions/performances, which may involve human interaction, which can be performed during the execution of a composite application. A guided procedure may be common to a variety of applications. Components 300 may be classified into design-time components 310 and run-time components 370. Metadata repository 360 may be part of, and/or interact with both design-time components 310 and run-time components 370. Design-time components 310 may be used to generate run-time components 370. Design-time components 310, run-time components 370, and metadata repository 360 are examples of similarly-named components described previously.

Design-time components 310 include modeler 320 and generator 340. Modeler 320 includes process modeler 330, pattern modeler 322, and action modeler 324. Process modeler 330 includes workflow modeler 332 and context modeler 334. Workflow modeler 332 allows process workflow for a guided procedure to be modeled, and context modeler 334 provides context definition. That is, context modeler 334 allows relations between other processes to be defined. For example, an application may have more than one way of being activated, for example, Intranet Web-based form versus remote voice control. Context modeler 334 can provide for both activation mechanisms to be associated with the application. Pattern modeler 322 provides workflow patterns (e.g., delegation, approval) for workflow modeler 332, and action modeler 334 provides actions for workflows. Modeler 320 also includes a metadata API 326, which provides access to the data in metadata repository 360. Thus, access to metadata regarding guided procedures can be provided.

Generator 340 includes template generator 342, state chart generator 344, pattern generator 346, action generator 348, and metadata API 350. In one embodiment templates describe a workflow that may be may be implemented using workflow patterns. Workflow patterns may contain actions that define the workflow and therefore, part of the template. Thus, a pattern may be viewed as an abstraction of an action, and a template may be viewed as an abstraction of work flow pattern. For example, a template could describe a workflow for ordering a product (e.g., a computer). The template may specify a workflow pattern for obtaining manager approval. The pattern could have certain actions that need to be undertaken to complete the workflow. An example of an action could be finding the names of the employee's managers. The approval pattern, moreover, could be used for different templates.

Template generator 342 generates templates, state chart generator 344 generates state charts, pattern generator 346 generates patterns, and action generator 348 generates actions for the run-time environment. Metadata API 350 provides access to the metadata in metadata repository 360. Metadata repository 360 can include one or more templates 364, one or more workflow patterns 366, one or more actions 368, and/or other metadata 362. The templates, patterns, actions, and metadata may be accessed by generator 340 to produce a guide procedure. Other information may be found in metadata repository 360, and metadata repository 360 does not necessarily include all the items represented in the figure in all embodiments.

Run-time components 370 provide instantiation for guided procedures, producing instances of application portions. In one embodiment procedural navigation and integration may be provided in a Universal Worklist (UWL). Run-time components 370 may include various services, for example, portal connector service 382, KM service 384, visualization service 386, and/or workflow service 388. The services depicted in FIG. 3 are merely representative, and are not to be understood as necessary or restrictive of the type of services possible. For example, run-time components 370 could also include one or more of object access services, context sharing service, content services, and metadata services.

Object access services can allow objects in an object access layer to be accessed. Context sharing service can provide context to a workflow. For example, when a user accesses a workflow, a context sharing service can provide a link to the proper portions of the workflow. For instance, many workflows involve inboxes, where new tasks for the workflow may be sent. The inbox may provide a link to the proper portion of the workflow if the context is known. Content services can provide services for executing functions based on generic calls. For example, a workflow may need an application (e.g., a composite application, an HRM application, a CRM application) to be initiated. By making a generic call to content services, the application may be initiated. Content service may support integration with an application and/or a user interface.

Portal connector service 382 can provides a connection service to a portal. KM service 384 can provide a connection service to a KM module. Visualization service 386 can provide functionality to a visualization agent. For example, various combinations of visualization and/or other presentation of data may be possible based on a work mode of a user. In another example, information may be presented to a user to provide iconic views of one or more business processes, including status and structure. The manner in which the data and interaction of the various services for the user is made can be controlled/managed via one or more visualization services 386. Workflow service 388 can provide a connection service to an ad-hoc workflow. This workflow may be very user-centric, allowing the assignment of not only tasks handled by transactions in business systems, but also tasks that require user handling (e.g., compose e-mail).

Components 300 may have a variety of features. For example, the components may provide context mapping for building blocks, and a user profile may be automatically used and updated. In certain implementations, ad-hoc administrations of running workflows may be supported and guided procedures may be monitored and analyzed.

These components can provide an infrastructure to enable the functioning of an enterprise network upon which the remaining concepts can be built. A more detailed description of the grid computing within the context of the enterprise network will follow.

Figure 4:
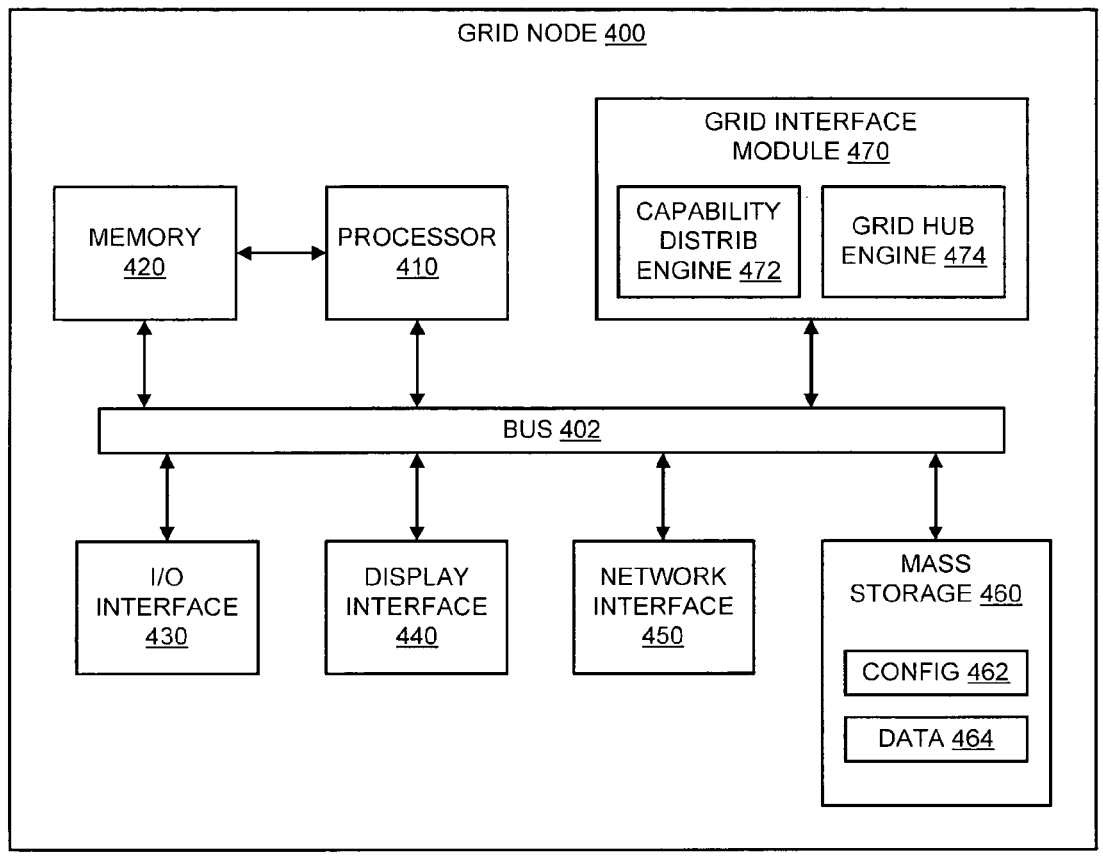
FIG. 4 is a block diagram of an embodiment of a grid node with a grid interface module.

FIG. 4 is a block diagram of an embodiment of a grid node with a grid interface module. Grid node 400 includes one or more processors 410, and memory 420 coupled to processor 410. The coupling of components as used herein need not necessarily refer to physical connection. Coupling or interconnection as used herein may refer to physical connection, electrical connectivity, and/or communicative coupling. Processor 410 may include any type of microprocessor, central processing unit (CPU), processing core, etc., suitable for executing the functions of grid node 400, including participating within a grid trading network. Processor 410 controls the overall operation of grid node 400, and may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 420 represents the main memory of grid node 400 to provide temporary storage for code or data to be executed/operated on by processor 410. Memory 420 may include read-only memory (ROM), flash memory, one or more varieties of random access memory (RAM), or the like, or a combination of such devices or technologies. Processor 410 and memory 420 are coupled to bus system 402. Bus system 402 is an abstraction that represents any one or more separate physical buses, communication lines/interfaces, and/or point-to-point connections, connected by appropriate bridges, adapters, and/or controllers. Therefore, bus system 402 may include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire").

Also coupled to processor 410 through bus system 402 are one or more input/output (I/O) interface(s) 430, which represent mechanisms for interacting with a user, one or more display interface(s) 440, which represent mechanisms for providing a visual display of information, one or more network interface(s) 450, which represent mechanisms to connect to a network, a grid, and/or an enterprise network, and one or more mass storage mass storage device(s) 460. I/O interface 430 may include audio I/O, data and cursor control (e.g., keyboard, mouse), etc. Display interface 440 may include a monitor or screen display. Network interface 450 may be, for example, a twisted wire port (e.g., Category-5 cable), an Ethernet adapter, etc. Mass storage 460 may be or include any conventional medium for storing large volumes of data in a non-volatile manner. Mass storage 460 may hold data/instructions in a persistent state (i.e., the value is retained despite interruption of power to grid node 400), which may include code and/or data 464, and configuration settings (config) 462.

Grid node 400 includes grid interface module 470, which provides the functions for interfacing with a grid trading network to enable the grid computing. Grid interface module 470 may include capability passing engine 472 and grid hub engine 474, which may be hardware or software or other modules to provide the functions related to participation in the grid trading network. Grid interface module 470 and/or its components, capability passing engine 472 and/or grid hub engine 474, can exist independently of the other components of grid node 400, or may represent services/functions available from one or more components of grid node 400. Grid interface module 470 may be coupled to other software or hardware components of a host computing device. Coupling to software components may be through the use of application program interfaces (APIs), for example, function calls, etc. Coupling to hardware components may include wireless or wired communication links, electrical or optical interfaces, etc.

Capability passing engine 472 can provide functionality to enable grid interface module 470 to provide a task request to another node on a grid trading network and pass functionality and/or data necessary for the other node to perform the requested task. Capability passing engine 472 may include interface hardware and/or software to interface with an enterprise infrastructure or environment that allows grid node 400 to physically and communicatively integrate with a grid trading network. Such interfacing may allow grid node 400 to perform functions on the grid and communicate with other grid participant nodes. The interfacing can allow grid node 400 to pass functionality to another grid participant for a transaction where grid node 400 acts as a hub.

Grid hub engine 474 refers to functionality to enable grid interface module 470 to perform distribution of tasks and enable grid node 400 to act as a hub for one or more transactions on the grid trading network. Grid hub engine 474 may include interfacing hardware and/or software as described above with respect to capability passing engine 472, and/or may use interfacing hardware and/or software included by grid interface module 470. Grid hub engine 474 may include features to enable grid node 400 to request hub status from the enterprise or on the trading network. In one embodiment grid node 400 is flagged as a hub on the trading network with respect to one or more transactions. Grid node 400 may act as the hub node, for example, for a transaction originated or initiated by grid node 400. In another embodiment grid node 400 is selected as a hub node by a transaction initiator, for example, because grid node 400 may include functionality necessary to complete the transaction, and it makes sense for grid node 400 to be the hub and pass the functionality to other nodes in the network.

Grid interface module 470 may include hardware, software, and/or a combination of these. In a case where module 470 includes software, the software data, instructions, and/or configuration may be provided via an article of manufacture by a machine/computing device/hardware. An article of manufacture may include a machine accessible/readable medium having content to provide instructions, data, etc. The content may result in a computing device, as described herein, performing various operations or executions described. A machine accessible medium includes any mechanism that provides (i.e., stores and/or transmits) information/content in a form accessible by a machine (e.g., computing device, electronic device, electronic system/subsystem, etc.). For example, a machine accessible medium includes recordable/non-recordable computer-readable storage media (e.g., read only memory (ROM), random access memory (RAM), magnetic disk storage media, optical storage media, flash memory devices, etc.), as well as communication media such as electrical, optical, acoustical or other form of propagated signals (e.g., carrier waves, infrared signals, digital signals, etc.). The machine accessible medium may further include a computing device having code loaded on a storage that may be executed when the computing device is in operation. Thus, delivering a computing device with such code may be understood as providing the article of manufacture with such content described above. Furthermore, storing code on a database or other memory location and offering the code for download over a communication medium via a propagated signal may be understood as providing the article of manufacture with such content described above.

Figure 5:
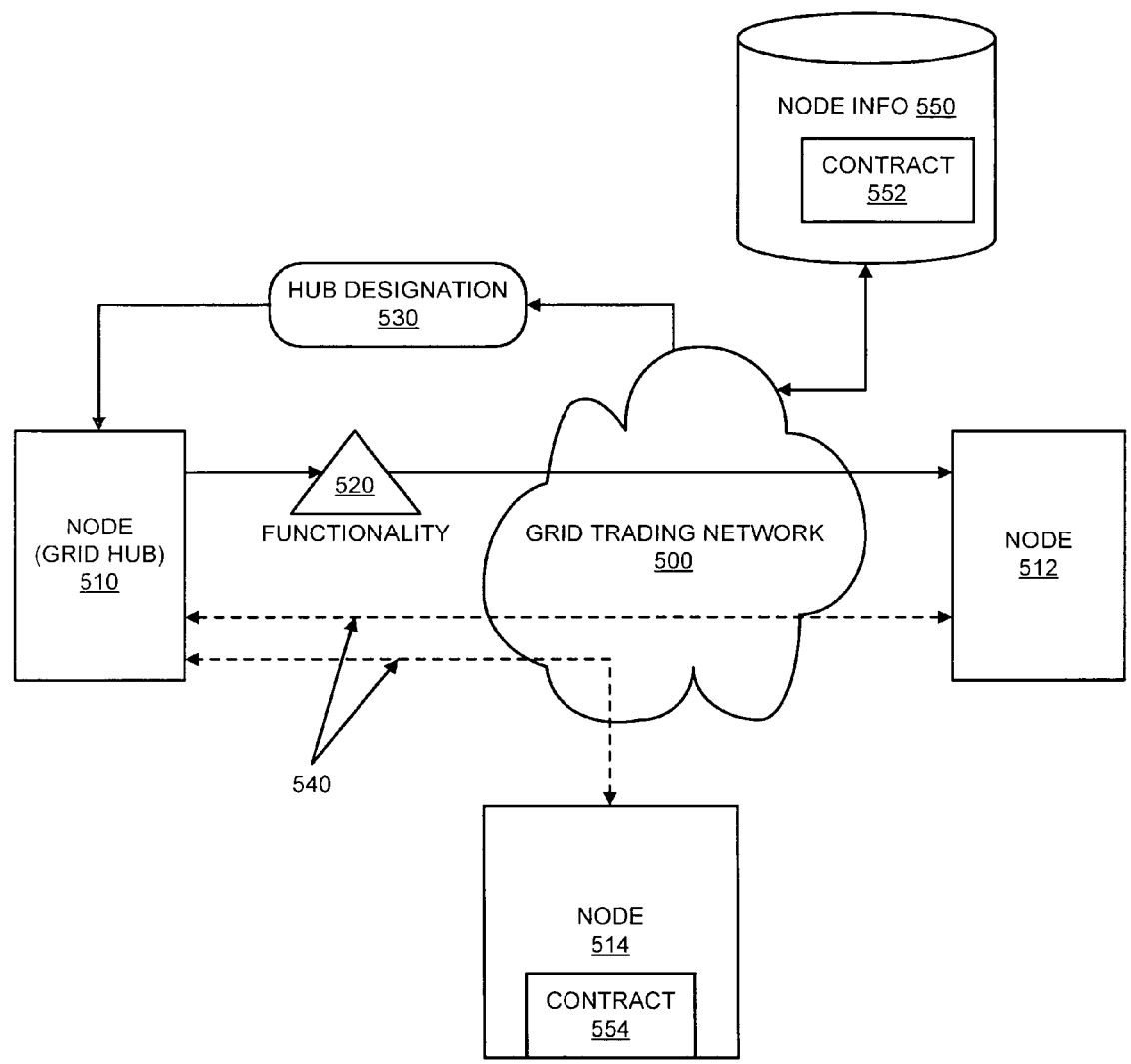
FIG. 5 is a block diagram of an embodiment of nodes of a grid trading network engaging in system-to-system functionality exchange.

FIG. 5 is a block diagram of an embodiment of nodes of a grid trading network engaging in system-to-system functionality exchange. Grid trading network 500 provides one example of a grid trading network according to any embodiment previously described. Grid trading network 500 may include or be included within an enterprise network. Thus, grid trading network 500 may extend within an enterprise network between departments or between geographically separated locations. Thus, the partitions of the "entities" that participate in the grid trading network 500 may be physical or merely logical. In another embodiment grid trading network 500 includes at least a portion of multiple different enterprise networks. For example, one or more departments at two or more different enterprises or companies may have grid trading network 500 established between them. Grid trading network 500 may include interconnecting hardware and communication lines, as well as enterprise servers or application service entities. Grid trading network 500 may include one or more components of an enterprise network as previously described, which may provide an infrastructure to allow the interaction of computing devices in grid trading network 500.

In one embodiment node 510 acts as a grid hub. As previously described, node 510 may act as a hub for one or more transactions, as the hub designation may be dynamic. In one embodiment multiple nodes of a trading network with be designated as hubs at a given moment, as multiple transactions may be occurring across the trading network at a given time, and the one or more of the multiple transactions may have a different hub node.

As depicted, nodes 512-514 also participate in grid trading network 500, and act in the transaction depicted as receiving nodes, or as potential or intended recipient nodes. In one embodiment node 510 passes functionality 520 to node 512. Functionality 520 may include any type of functionality, computing capability, processing capability, application, process, and/or other ability to perform one or more operations on data. The expression "functionality" may be used herein for purposes of simplicity in description to represent any or all of these concepts, and is not used by way of limitation. Functionality 520 may represent a binary, an application, a function call, a permission to access an enterprise service, a business logic element, etc. Functionality 520 may be passed to node 512 because node 512 lacks a capability to perform a task requested by node 510. In one embodiment functionality 520 is passed to node 512 regardless of whether node 512 already has the exact or similar functionality, for example, if it is simply standard procedure for functionality to be passed.

In one embodiment node 510 does not pass functionality 520 to node 514. Functionality 520 may not be passed to node 514, if, for example, node 514 already include the same or similar functionality. In one embodiment node 514 disallows functionality 520 to be passed from node 510. The disallowing of functionality 520 from node 510 may be because of the identity of node 510 (e.g., passing of functionality is not allowed from entities that do not authenticate properly, certain nodes in the network may be excluded from a list of allowable sources of functionality, node 510 may be in a location forbidden from passing functionality to node 514, etc.), the type of functionality (e.g., certain types of functionality may be excluded, certain types of functionality may be determined to be against a security policy, etc.), and/or because of some other restriction on receiving functionality. In one embodiment node 514 may disallow receipt of any functionality from any node.

In one embodiment one or more nodes participating in grid trading network 500 may have an associated contract related directly or indirectly to participation of the node in the network. For example, a contract of a node with an enterprise or with a particular participant node or a participant group may affect interaction over grid trading network 500. In another example, a contract may directly affect participation, for example, if restrictions are set forth about specific transactions or transaction types, about specific functionality, etc. A contract may be stored within the associated node, and/or within a storage external to the node. For example, node 514 may include contract 554, which may represent one or more rules for participation of node 514 in grid trading network 500, and/or conditions of participation. Contract 552 may relate to node 514 and be stored in a network entity having node information 550. An entity with node information 550 may be a node on grid trading network 500, an enterprise or other network server, a central data store within one or more network, etc. In one embodiment contract 552 is an element of enterprise data that can be accessed upon proper credentials within an enterprise.

In one embodiment node information 550 includes contracts or other node information (e.g., capability lists, resource availability, etc.) for one or more nodes within a network (e.g., within grid trading network 500, within an enterprise network). Node 510 as a hub node may be enabled to access node information 550 to determine whether a particular node meets one or more criteria for use as a node in a transaction, whether a particular node needs functionality passed, etc. Node information 550 may be stored within grid trading network 500, but is not necessarily so stored.

In one embodiment node 510 receives hub designation 530, which may indicate node 510 as a hub. Hub designation 530 may be valid for one or more transactions, for a period of time, etc. Hub designation 530 may be a simple indication within node information 550 or elsewhere in grid trading network 500, or a participant network accessible to or through grid trading network 500.

Figure 6:
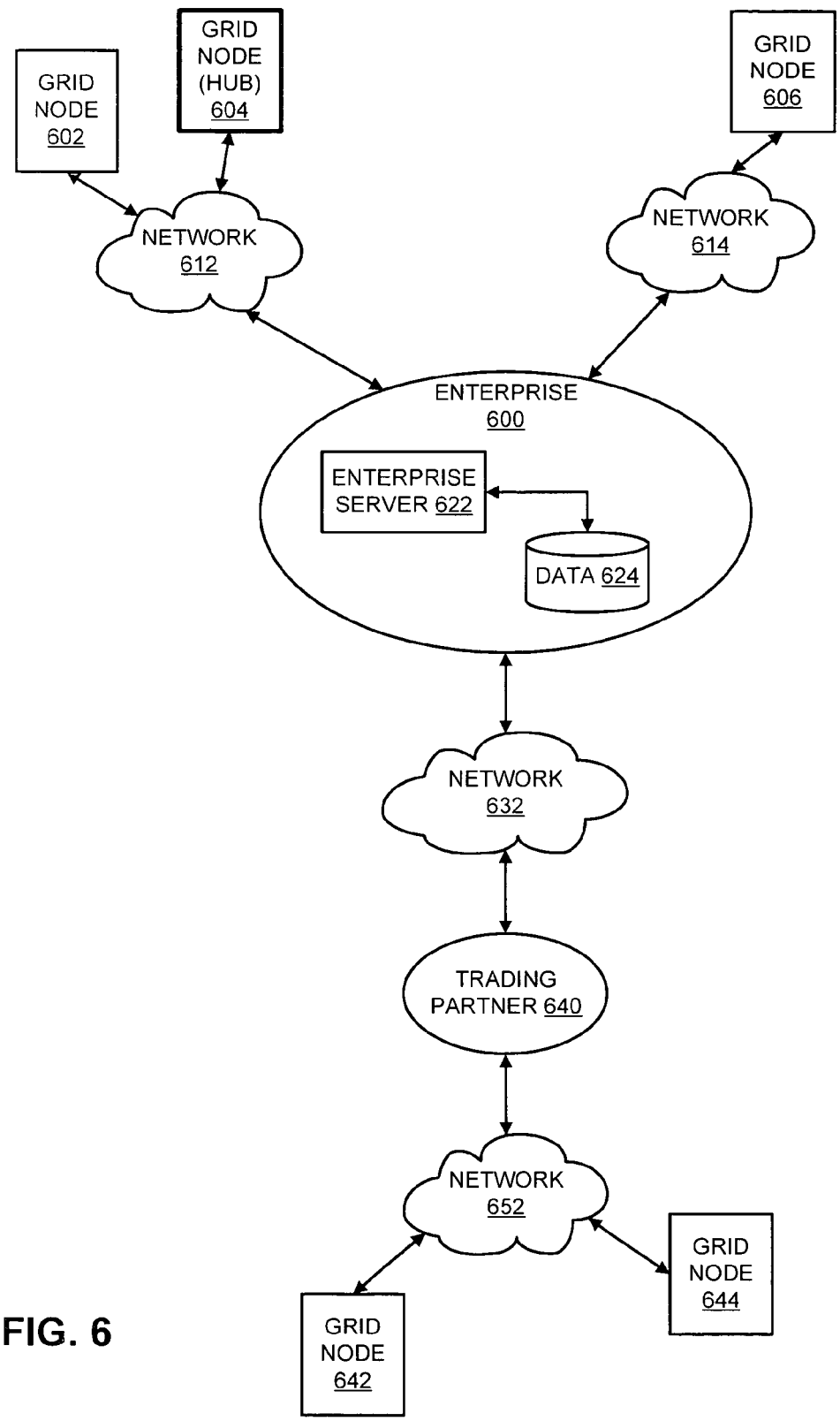
FIG. 6 is a block diagram of an embodiment of an enterprise coupled to a trading partner.

FIG. 6 is a block diagram of an embodiment of an enterprise coupled to a trading partner. The coupling depicted represents one embodiment of connectivity to provide a grid trading network as described herein. Enterprise 600 may be a company, for example, and may include a variety of computing resources, including one or more networks, whether local or larger area, and/or virtual. Enterprise 600 can include one or more enterprise servers 622, which may be coupled with enterprise data 624. Enterprise server 622 provides services to computing devices within enterprise 600.

Enterprise 600 may include one or more computing devices that are part of a grid network that distributes tasks as well as computing capability. The computing devices may be connected within enterprise 600 in any manner understood in the art, including through network connections. For example, grid nodes 602 and 604 (which is also the hub node for a snapshot of the system shown in FIG. 6) connect to enterprise 600 through network 612. Grid node 606 connects to enterprise 600 through network 614. Networks 612-614, as well as networks 632 and 652, may be or include a local area network, a wide area network, a virtual network (e.g., a virtual private network (VPN)), a wireless network, a wireline network, etc. Networks 612-614 may represent that grid nodes 602-604 and 606 connect to enterprise via different networks, or that the grid nodes are separated geographically and/or logically (e.g., within different departments).

Enterprise 600 connects with trading partner 640 through network 632, which may be a similar kind of network as networks 612-614, including a wide area network such as the Internet. Trading partner 640 may represent another enterprise, or a sub-part of another enterprise. In one embodiment trading partner 640 is a government agency, which may pass functionality to a private company or another government agency, such as a regulation change or a compliance form, etc. Trading partner 640 may in turn include grid nodes 642-644 coupled through network 652. Grid nodes 642-644 may participate in a transaction for which grid node 604 is the hub.

Figure 7:
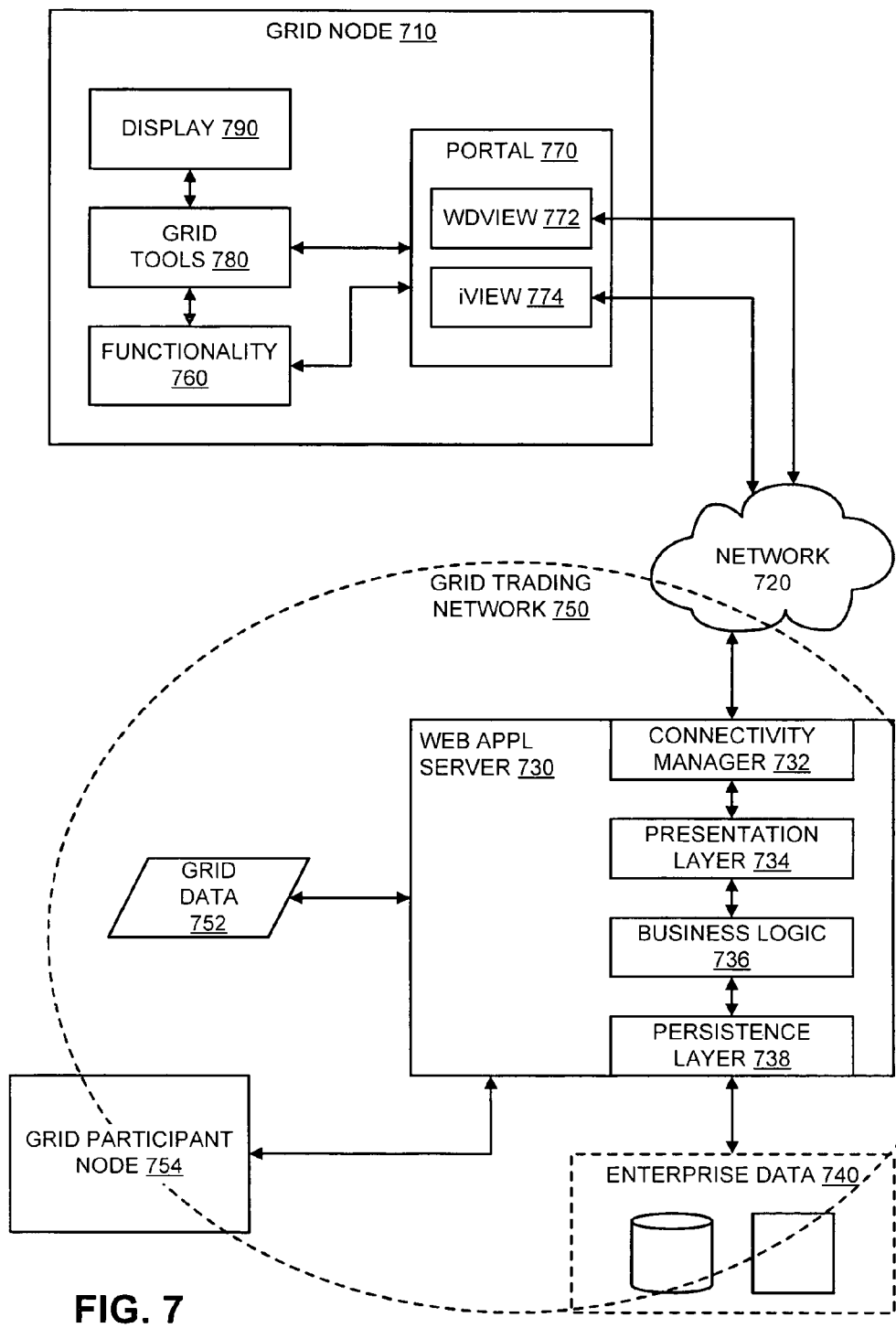
FIG. 7 is a block diagram of an embodiment of a grid node with grid tools and a portal interfaced with a grid trading network.

FIG. 7 is a block diagram of an embodiment of a grid node with grid tools and a portal interfaced with a grid trading network. Grid node 710 may be a node similar to any embodiment previously mentioned, with portal 770 having WebDynpro View 772 and/or iView 774, grid tools 780, display 790, and functionality 760. Display 790 may include one or more of an LCD (liquid crystal display) device, a TFT (thin film transistor) display, a CRT cathode ray tube device, a touchscreen, etc. In one embodiment display 790 includes one or more grid tools 780, which represent grid tools for providing access and/or presentation of information about grid trading network 750 to grid node 710. Grid tools 780 may place information on display 790, render a WebDynpro page on display 790, provide interactive links viewable on display 790, etc. Grid tools 780 may be generated by, or may include, or may be one or more portals 770. Portal 770 provides a controllable access point over network 720 to an enterprise network and/or grid trading network 750.

Portal 770 may include one or more WebDynpro (WD) Views 472, which represent the access functionality of portal 770 to interface with network 720 and retrieve information, including dynamic data, access data objects, send information or commands to the enterprise or grid trading network 750, etc. Portal 770 may enable grid node 710 to pass functionality 760 to grid participant node 754, which represents another node within grid trading network 750. In one embodiment the passing of functionality 760 may be performed in connection with one or more grid tools 780. In another embodiment the passing of functionality 760 can be considered to be independent of grid tools 780. If grid node 710 is receiving functionality 760, grid tools 780 could in one embodiment be used to implement the capabilities received. Functionality 760 may include computing or processing capability, as previously described. WebDynpro View 772 represents a technology for interfacing the enterprise/grid, and should not be understood as limited to one particular implementation. In one embodiment WebDynpro Views 772 interact with a single data object. In one embodiment iView 774 is used in addition to or in place of a WebDynpro View. iView 774 can provide similar functionality as WebDynpro View 772.

Grid node 710 is coupled to grid trading network 750 over one or more network interfaces, including portal 770, over network 720. Network 720 represents one or more hardware and/or software elements that enable grid node 710 to interconnect with other devices on grid trading network 750, including devices to which grid node 710 can pass functionality 760, when operating as a grid hub, or to receive functionality 760 from another grid participant when operating as a recipient node for another hub node. All or part of network 720 may be included within grid trading network 750. Grid node 710 can also be considered to be "within" grid trading network 750, from the perspective that grid node 710 is a participant in the network. Grid participant node 754 may be the same or similar to grid node 710, and may be within the same enterprise, or within a different organization.

Grid node 710 may be coupled to Web application server 730, which represents one mechanism capable of providing interconnection services or enterprise services, and in one embodiment represents a WAS (WEB APPLICATION SERVER) available from SAP AG. Although the structure of Web application server 730 may differ with various implementations, in one embodiment Web application server 730 includes connectivity manager 732, presentation layer 734, business logic 736, and persistence layer 738.

Connectivity manager 732 may include an Internet communication manager, and may couple to external applications and/or an exchange infrastructure to enable providing services associated with disparate systems. Connectivity manager 732 may provide a connection to portal 770, a browser, or another interface of grid node 710. Connectivity manager 732 may operate with, or employ any of a variety of protocols, including, but not limited to HTTP (HyperText Transfer Protocol), SMTP (Simple Mail Transfer Protocol), SOAP (Simple Object Access Protocol), UDDI (Universal Description, Discovery and Integration), RFC (Remote Function Call), FTP (File Transfer Protocol), etc.

Presentation layer 734 may provide information to grid node 710 for display on display 790. Presentation layer 734 may employ any of a number of techniques described in above-referenced U.S. patent application Ser. No. 11/181, 644, filed Jul. 13, 2005. Business logic 736 provides capabilities to Web application server 630 to provide the infrastructure for connecting grid node 710 to devices and services to enable aspects of grid network participation as described herein. Presentation layer 734 and/or business logic 736 may be enabled by JAVA technologies and/or ABAP (Advanced Business Application Programming) technologies.

Persistence layer 738 can provides database or data abstraction, coupling grid node 710 and potentially other devices to enterprise data 740. Persistence layer 738 may include connection, management, and/or caching capabilities. Web application server 730 may also receive and forward grid data 752 to grid node 710, and/or pass data from grid node 710 to one or more entities on grid trading network 750.

Figure 8:
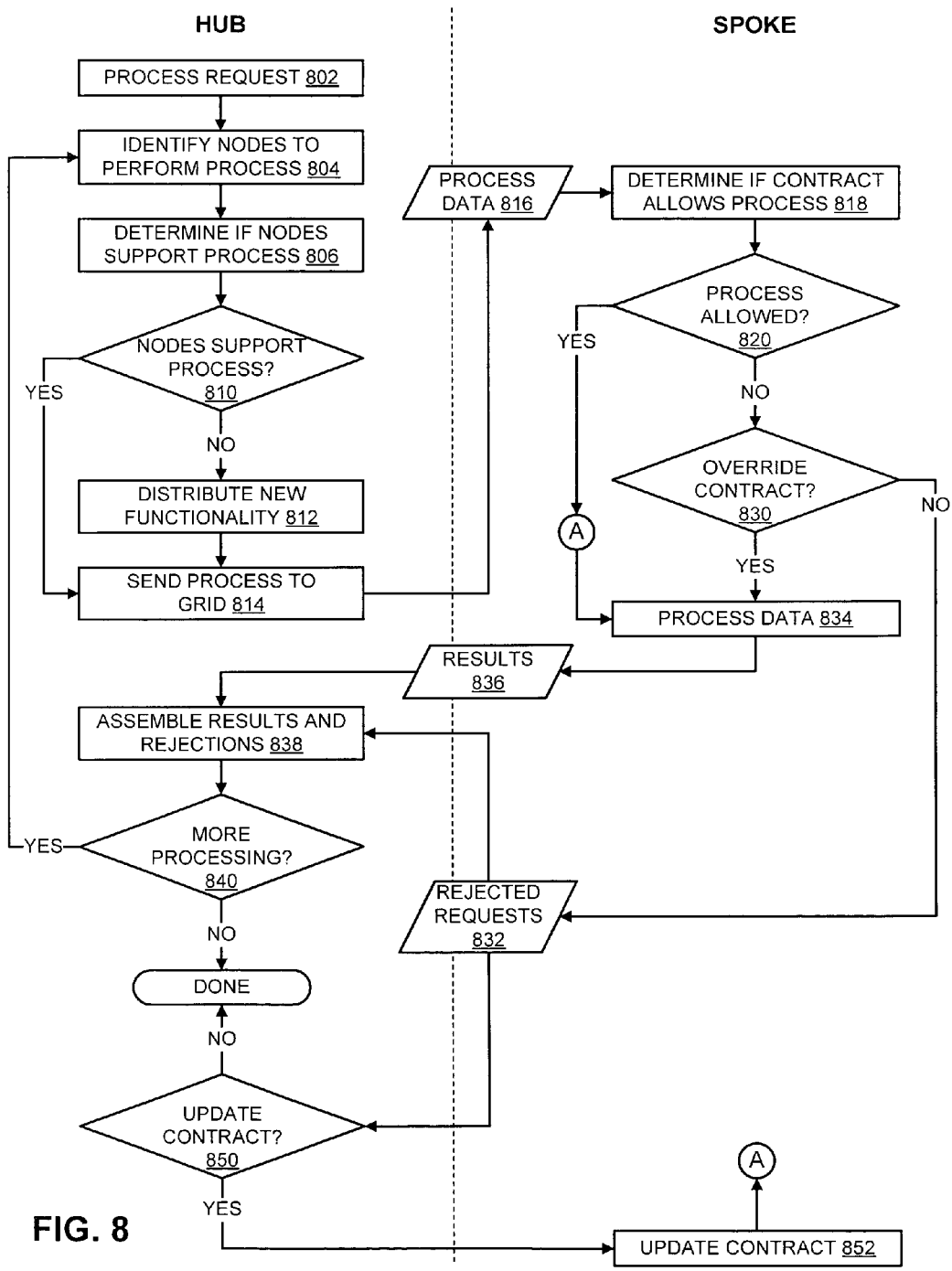
FIG. 8 is a flow diagram of an embodiment of a hub node distributing processing and associated functionality to a spoke node.

FIG. 8 is a flow diagram of an embodiment of a hub node distributing processing and associated functionality to a spoke node. The "hub" and "spoke" can be understood as a hub node and a spoke node that are trading network participant nodes according to any embodiment previously described. Certain operations or processes are placed under each of the hub and the spoke, depicting that in the embodiment shown these operation occur at the indicated node. Other embodiments are possible.

The hub node generates a process request, 802. A process request refers to a task or tasks for processing or operation on a grid trading network. The hub node may identify nodes to perform the process, 804. As described above, identifying the nodes may include accessing a database of information related to participant nodes of the trading network, and may include determining capabilities that each node has, determining what restrictions are placed on a node by a contract, determining a load upon the potential participant, or other determination of qualification or desirability of a node to perform a task. The hub node may determine if the identified nodes support the process, 806. Determining whether the nodes support the process can refer to a determination made by the hub node or an identifying by the hub node that the nodes do or do not have a capability necessary to perform the process or task requested.

If the nodes do not support the process, 810, the hub node distributes new functionality to one or more nodes that need the functionality, 812. When the nodes have the needed functionality, the hub node distributes the process to the grid, meaning distributing the requested task or parts of the task to the identified nodes, 814. In addition to the functionality, the hub node may send process data, 816, to enable the nodes to perform the process. In one embodiment the process refers to one or more operations that the nodes can perform solely on local data, and sending process data 816 may not be required.

In one embodiment the hub node may determine from a contract for the spoke node whether the spoke node can participate in the process. In addition to the determination by the hub node, or in lieu of the determination by the hub node, the spoke node may determine if a contract associated with the spoke allows the process, 818. If the process is allowed, 820, the spoke node may process the data, 834. If the process is not allowed, 820, the spoke may determine if the contract should be overridden, 830. If the contract should be overridden, the spoke node processes data, 834, to participate in the process request made by the hub. The contract may be overridden, for example, if the hub node authenticates as a particular entity, if the process request is related to a process known to the spoke node, or some other exception occurs. In one embodiment the contract may indicate a general refusal of a node to participate, for example, if the spoke is part of a secretive project team, but the contract can be overridden for other members of the team, for an administrator, etc.

The spoke node sends back results 836 to the hub node, which can assemble results and rejections, 838, from nodes that were requested to participate. If the hub node has more processing to perform, 840, the hub node may repeat the process. If no more processing is to be performed, the hub node finishes on the transaction.

If a contract is determined to not be overridden, 830, the spoke node, rather than processing data and sending results, sends a rejection. Rejected requests 832 are reported back to the hub node and may initiate a determination of whether to update the contract of the spoke node, 850, with respect to the hub node, and/or with respect to the trading network as a whole. If a determination is made to update the contract, the spoke node updates the contract 852 locally to implement the changes. Determining whether to update the contract may include user interaction, and a human intervention to change something in the contract or change something in enterprise data related to the contract.

Figure 9:
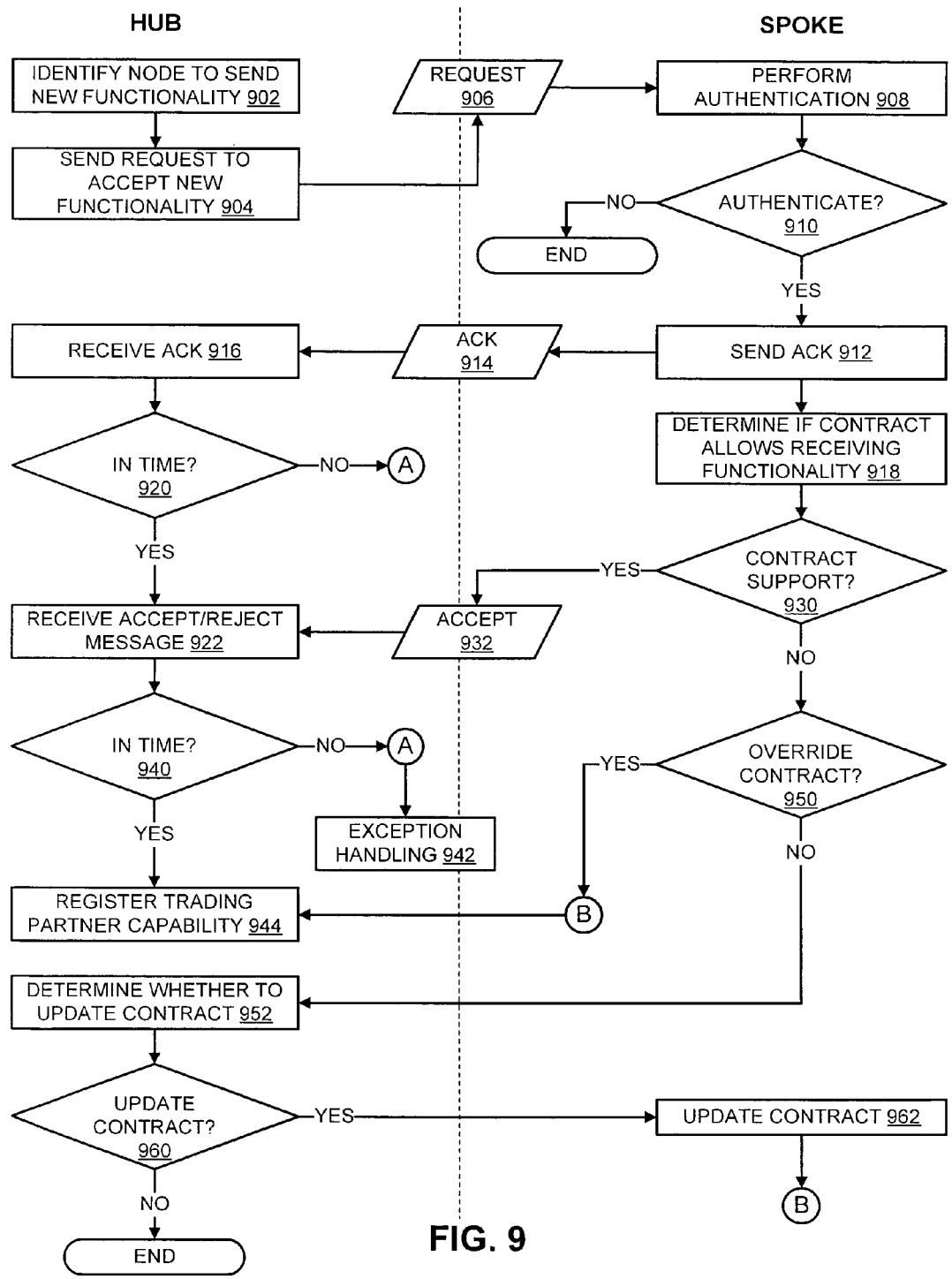
FIG. 9 is a flow diagram of an embodiment of a hub node dispatching functionality to a spoke node according to a contract between the hub and spoke nodes.

FIG. 9 is a flow diagram of an embodiment of a hub node dispatching functionality to a spoke node according to a contract between the hub and spoke nodes. As with the previous figure, a hub and a spoke are shown, representing at least two parties or entities in a trading network transaction. The hub node manages the transaction, and the spoke node participates by performing operations on data to implement the transaction or process request.

The hub identifies a node to send new functionality, 902. This may be performed in conjunction with a transaction, as described in the figure above. The hub may send a request for the node to accept the new functionality, 904. The request, 906, is sent across the trading network to the spoke, which may perform authentication, 908. The spoke may act differently depending on the source of the request. Authentication may be a binary process, or may occur in grades, with different levels of authentication, or levels of recognition by the spoke of the hub. In one embodiment authentication refers to a determination by the spoke of whether the hub authenticates as a hub, or a valid source for a trading network request. The authentication validity can exist for a particular request or transaction, for a project, for a department, etc. If the hub fails to authenticate, 910, the request to send new functionality may fail. If the hub authenticates, 910, the spoke may send an acknowledgement, 912 and 914, to the hub. The hub receives the acknowledgement, 916, and determines whether the acknowledgement was timely, 920. If the acknowledgement is not timely, the hub may perform exception handling, 942, to determine how to handle the functionality passing between the hub and the spoke.

In addition to sending the acknowledgement, 912, the spoke determines if the contract allows for receiving the specified functionality, 918. If the contract supports receiving the functionality, 930, the spoke accepts, 932, the request to receive functionality, and the hub processes received messages, including acknowledgement 914 and acceptance 932, or a rejection (not shown). The hub receives the accept or reject message, 922, and determines whether the message was received in time, 940. If message was not received in time, the hub may perform exception handling, 942.

If the message was received in time, 940, the hub can register the trading partner capability, 944. In one embodiment the trading network, and/or an enterprise, may keep a register of capabilities of nodes of the trading network, or nodes with which the enterprise engages in trading transactions. The register may be updated when new functionality is distributed, or upon the discovery of new functionality among partners. By keeping the information updated, hubs in the trading network can use the information to make determinations about which nodes to use in performing tasks.

If the contract does not support the spoke's receiving of the functionality, the spoke may determine whether to override the contract, 950. If the contract is overridden, the functionality can be passed, and a capability register updated, 952. If the contract is not overridden, a rejection message may be sent (not shown) to the hub. Additionally, the hub may determine in response to the spoke refusing to override the contract whether to update the contract, 952. Similar to what was previously described, updating the contract may include user interaction, interaction with an administrator and/or a server, the changing of values local to the spoke and/or on the enterprise data, or another location, etc. If the contract is to be updated, 960, the spoke can update the contract, 962, and accept the functionality passed by the hub, which functionality can be registered, 952. If the contract is not to be updated, the process may terminate.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method comprising:
   initiating a transaction between participant nodes of a trading network including a grid network, including a first participant node receiving via the trading network a hub designation dynamically assigning to the first participant node a hub role specific to the transaction, wherein the assigning the hub role to the first participant node is in response to a determining that the first participant node includes a computing functionality for the transaction, wherein the hub role includes a distributor role for distributing the computing functionality;
   wherein, in response to the assigning of the hub role, the first participant node determines whether a second participant node of the trading network needs the computing functionality for the transaction,
   wherein, in response to determining that the second node needs the computing functionality, the first participating node sends the computing functionality from the first participant node to the second participant node, wherein the second participant node installs the computing functionality, and wherein the transaction includes:
      the first participant node distributing respective tasks of the transaction to multiple participant nodes operating as spoke nodes of the transaction, including the first participant node distributing to the second participant node a first task of the transaction after the sending the computing functionality;
      in response to distributing of the first task, the second participant node executing the installed computing functionality to perform an operation on data of the first task; and each of the multiple participant nodes sending to the first participant node respective results of the distributed tasks.

2. The method of claim 1, wherein the first participant node operates as a spoke node for another transaction, and wherein one of the multiple nodes is assigned a hub role for the other transaction.

3. The method of claim 1, wherein a participant node has an associated contract defining permissible participation of the participant node in the trading network.

4. The method of claim 3, wherein the contract defining permissible participation of the participant node further comprises limiting access to the participant node by other participant nodes of the trading network.

5. The method of claim 4, wherein the contract limiting access to the participant node by other participant nodes of the trading network comprises defining conditions for passing computing functionality to the participant node by other participant nodes.

6. The method of claim 4, wherein the contract limiting access to the participant node by other participant nodes of the trading network comprises disallowing the passing of computing functionality related to the distributed tasks to the participant node.

7. A method comprising:
a first node of a trading network receiving via the trading network a hub designation for initiating a transaction, the hub designation dynamically assigning to the first participant node a hub role specific to the transaction, wherein the assigning the hub role to the first participant node is in response to a determining that the first node includes a computing functionality for the transaction, wherein the hub role includes a distributor role for distributing the computing functionality;
in response to the assigning of the hub role, the first node determining whether a second node of the trading network needs the computing functionality for the transaction, the trading network including a grid network of which the first and second nodes are participant nodes, the grid network having an infrastructure to enable distribution between nodes of the trading network of computing functionalities and tasks of the transaction;
in response to determining that the second node needs the computing functionality, distributing the computing functionality system-to-system from the first node to the second node to provide the second node with a capability to execute the distributed computing functionality, the distributing the functionality initiated by the first node; and
wherein the transaction includes:
the first node distributing respective tasks of the transaction to multiple participant nodes of the trading network operating as spoke nodes of the transaction, including the first node sending an indication to the second node after the distributing the computing functionality, the sending the indication to indicate that a first task of the transaction is to be performed by the second node;
the second node responding to the indication by executing the distributed computing functionality to perform an operation on data of the first task; and
each of the multiple nodes sending to the first node respective results of the distributed tasks.

8. The method of claim 7, wherein the trading network extends between different departments of an enterprise.

9. The method of claim 8, wherein the first node belongs to one department and the second node belongs to a different department.

10. The method of claim 7, wherein the trading network extends between different enterprises.

11. The method of claim 10, wherein the first node belongs to one enterprise and the second node belongs to a different enterprise.

12. The method of claim 7, wherein the trading network extends between an enterprise and a government agency, and wherein the first node belongs to the government agency and the second node belongs to the enterprise, the first node to pass regulatory information to the second node.

13. The method of claim 7, wherein the computing functionality comprises at least one of a software application, a configuration parameter, a security policy, or a process.

14. The method of claim 7, wherein distributing the computing functionality comprises distributing functionality for the second node to perform operations on data already local to the second node, instead of operations on distributed data.

15. The method of claim 7, wherein distributing the computing functionality comprises distributing discrete functionality to provide the second node with capability to perform an operation that is completely executable at the second node.

16. The method of claim 7, wherein distributing the computing functionality comprises distributing distributed functionality to provide the second node with capability to perform an operation that is performed in conjunction with, and dependent upon an operation at another node of the trading network.

17. An article of manufacture comprising a non-transitory computer-readable storage medium having content stored thereon, which when accessed provides instructions to cause a device to perform operations including:
a first node of a trading network receiving via the trading network a hub designation for initiating a transaction, the hub designation dynamically assigning to the first participant node a hub role specific to the transaction, wherein the assigning the hub role to the first participant node is in response to a determining that the first node includes a computing functionality for the transaction, wherein the hub role includes a distributor role for distributing the computing functionality;
in response to the assigning of the hub role, the first node determining whether a second node of the trading network needs the computing functionality for the transaction, the trading network including a grid network of which the first and second nodes are participant nodes, the grid network having an infrastructure to enable distribution between nodes of the trading network of computing functionalities and tasks of the transaction;
in response to determining that the second node needs the computing functionality, distributing the computing functionality system-to-system from the first node to the second node to provide the second node with a capability to execute the distributed computing functionality, the distributing the functionality initiated by the first node; and wherein the transaction includes: the first node distributing respective tasks of the transaction to multiple participant nodes of the trading network operating as spoke nodes of the transaction, including the first node sending an indication to the second node after the distributing the computing functionality, the sending the indication to indicate that a first task of the transaction is to be performed by the second node;
the second node responding to the indication by executing the distributed computing functionality to perform an operation on data of the first task; and
each of the multiple nodes sending to the first node respective results of the distributed tasks.

18. The article of manufacture of claim 17, the content to provide instructions for determining whether the second node includes the computing functionality further comprising content to provide instructions for performing operations including:
accessing enterprise-level data to determine whether the second node includes the computing functionality.

19. A system comprising:
a network infrastructure including interfaces and interconnections to enable system-to-system interaction among nodes of a grid trading network; and
a first participant node of the grid trading network coupled to the network infrastructure to receive via the network infrastructure a hub designation for initiating a transaction on the grid trading network, the hub designation dynamically assigning to the first participant node a hub role specific to the transaction, wherein the assigning the hub role to the first participant node is in response to a determining that the first node includes a computing functionality for the transaction, wherein the hub role includes a distributor role for distributing the computing functionality, the first participant node further to determine, in response to the assigning of the hub role, whether a second participant node of the trading network needs the computing functionality for the transaction, the first participating node further to send the computing functionality from the first participant node to the second participant node in response to determining that the second node needs the computing functionality, and wherein the transaction includes:

- the first node distributing respective tasks of the transaction to multiple participant nodes of the trading network operating as spoke nodes of the transaction, including the first participant node distributing to the second participant node a first task of the transaction after the sending the computing functionality;
- in response to distributing of the first task, the second participant node executing the computing functionality to perform an operation on data of the first task; and
- each of the multiple nodes sending to the first node respective results of the distributed tasks, the first participant node further to act as a spoke with respect to a different transaction on the grid trading network, wherein one of the multiple participant nodes is assigned a hub role for the other transaction.

20. The system of claim 19, the first participant node to further:
- authenticate with the second participant node prior to passing the computing functionality to the second participant node.

21. The system of claim 19, the first participant node to further:
- access enterprise data coupled to the network infrastructure to obtain a contract of the second participant node, the contract to indicate permissible participation of the second participant node in the grid trading network.

22. The system of claim 21, the first participant node to further:
- determine based at least in part on the contract whether to pass tasks to the second participant node.

23. The system of claim 21, the first participant node to further:
- determine whether the contract permits passing functionality related to performing the task of the transaction to the second participant node; and
- if passing the functionality is permitted by the contract, pass functionality to the second participant node over the network infrastructure to enable the second participant node to perform the task related to the transaction.

24. The system of claim 19, wherein the first participant node is one of multiple hubs on the grid trading network, each hub a participant node acting as the hub for separate transactions on the grid trading network.

* * * * *